(12) United States Patent
Lou

(10) Patent No.: US 7,854,169 B2
(45) Date of Patent: Dec. 21, 2010

(54) SENSOR DEVICE AND ROLLING BEARING WITH SENSOR

(75) Inventor: Liming Lou, Yamatokoriyama (JP)

(73) Assignee: JTEKT Corporation, Osaka-shi (JP)

( * ) Notice: Subject to any disclaimer, the term of this patent is extended or adjusted under 35 U.S.C. 154(b) by 608 days.

(21) Appl. No.: 11/720,132

(22) PCT Filed: Nov. 24, 2005

(86) PCT No.: PCT/JP2005/021521

§ 371 (c)(1),
(2), (4) Date: May 24, 2007

(87) PCT Pub. No.: WO2006/057269

PCT Pub. Date: Jun. 1, 2006

(65) Prior Publication Data

US 2008/0037920 A1 Feb. 14, 2008

(30) Foreign Application Priority Data

Nov. 24, 2004 (JP) ............................. 2004-338577
Nov. 24, 2004 (JP) ............................. 2004-338586

(51) Int. Cl.
*G01M 13/04* (2006.01)
(52) U.S. Cl. ......................................... 73/660; 73/599
(58) Field of Classification Search .................. 73/593, 73/597, 598, 660, 599
See application file for complete search history.

(56) References Cited

U.S. PATENT DOCUMENTS 3,137,162 A * 6/1964 Kroll et al. .................... 73/644
4,870,866 A * 10/1989 Slack .......................... 73/599
5,642,944 A * 7/1997 Dublin et al. ................ 384/102
6,553,837 B1 * 4/2003 Lysen .......................... 73/579

FOREIGN PATENT DOCUMENTS

| JP | 2 38935 | | 2/1990 |
| JP | 2581755 | | 2/1997 |
| JP | 2002 67766 | | 3/2002 |
| JP | 2002 257796 | | 9/2002 |
| JP | 2004-45370 | | 2/2004 |
| JP | 2004100841 A | * | 4/2004 |
| JP | 2006177932 A | * | 7/2006 |
| JP | 2006292490 A | * | 10/2006 |

* cited by examiner

Primary Examiner—Hezron Williams
Assistant Examiner—Nashmiya Fayyaz
(74) Attorney, Agent, or Firm—Oblon, Spivak, McClelland, Maier & Neustadt, L.L.P.

(57) ABSTRACT

A sensor device includes: a detected part D having a movable element 5 and a fixed element 3 contacting each other in which a contact area of the both elements changes corresponding to an external load; a contact area detection sensor 2, provided to the fixed element 3, for detecting the contact area of the detected part D; and processing means for calculating the external load from an sensor output by using the correlation between the external load and the contact area.

7 Claims, 16 Drawing Sheets

Fig. 6
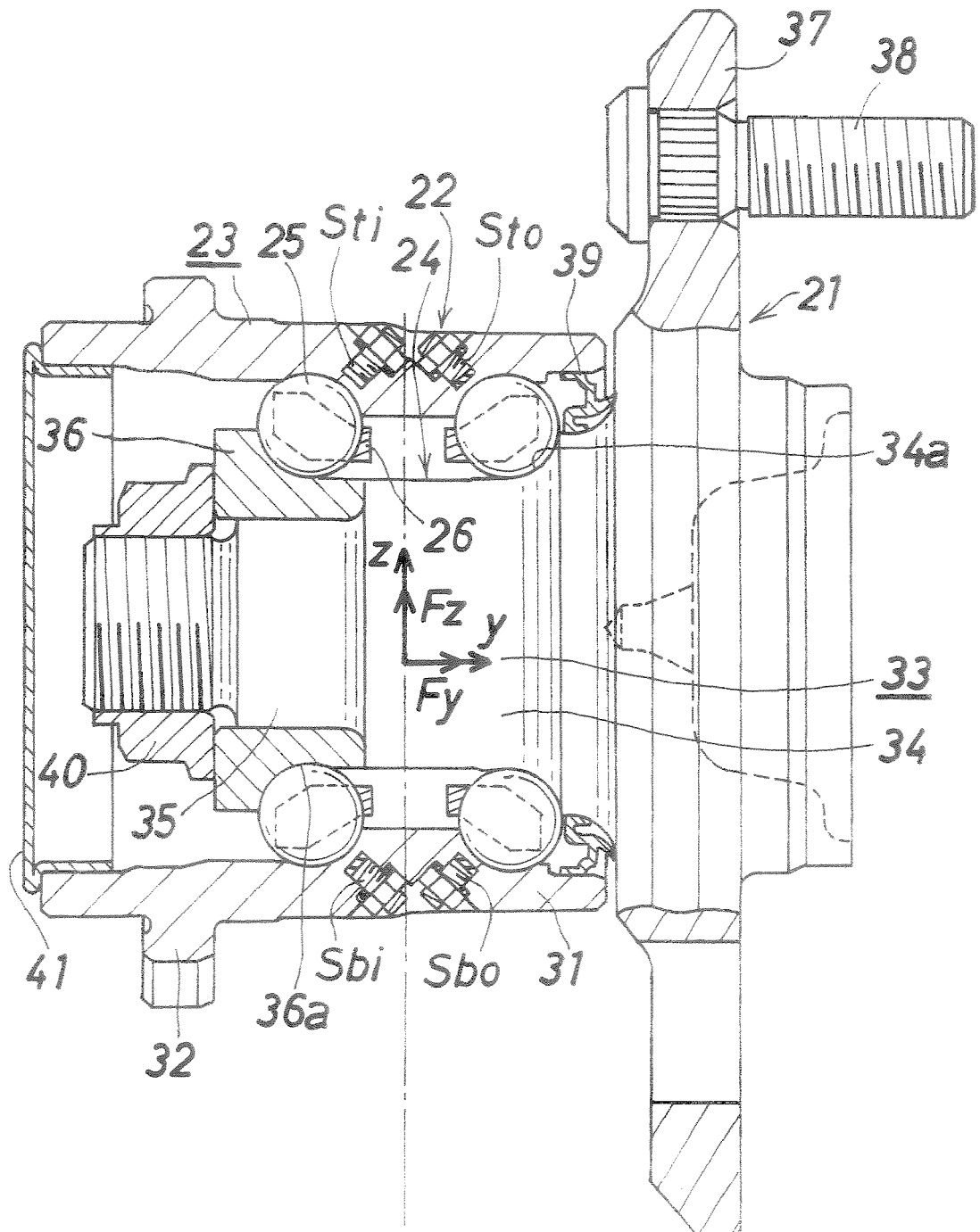
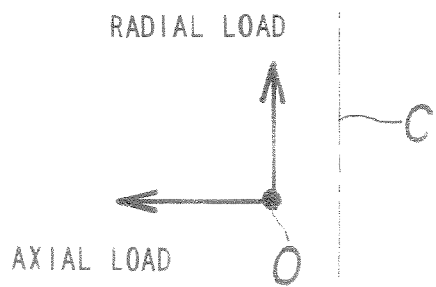

SENSOR DEVICE AND ROLLING BEARING WITH SENSOR

TECHNICAL FIELD

The present invention relates to a sensor device which is integrated with a rolling bearing and preferable for detecting various kinds of information of the rolling bearing, and a rolling bearing device with a sensor.

BACKGROUND ART

Since various kinds of information are required for controlling a motor vehicle, it is proposed to provide a sensor device to a hub unit (rolling bearing) having a fixed side raceway member fixed to the body side, a rotational side raceway member to which a wheel is mounted, and two rows of rolling elements disposed between the both members. For example Patent Document 1 (Publication of Japanese Patent Application Laid-Open No. 2004-45370) discloses an invention in which a magnetic impedance sensor is provided to a fixed side raceway member and a ring-shaped magnetized part facing the sensor is provided to a rotational side raceway member so as to calculate a ground contact load with high accuracy.

According to the rolling bearing device with a sensor of Patent Document 1, detection by the magnetic impedance sensor is affected by the material, shape and processing accuracy of a detected part, so there have been problems that selection of a material of a rolling bearing involves restrictions, and processing or a magnetized part and addition of another member are required in a detected part.

DISCLOSURE OF THE INVENTION

Problems to be Solved by the Invention

An object of the present invention is to provide a sensor device having less restriction in selecting the material of a detected part and not requiring additional processing to the detected part, and a rolling bearing device having such a sensor device.

Means for Solving the Problems

A sensor device according to the present invention includes: a detected part including a movable element and a fixed element contacting each other in which a contact area of the both elements changes corresponding to an external load; a contact area detection sensor, provided to the fixed element for detecting the contact area of the detected part, and a processing means for calculating the external load from a sensor output by using a correlation between the external load and the contact area.

Here, as the contact area, it is preferable to use a true contact area which is, when those having irregularities on the surfaces viewed microscopically contact each others a "contact area" of the irregularities.

The contact area of the rolling element and the fixed element increases when a load in a right angular direction with respect to the contact surface increases, and decreases when the load in the right angular direction to the contact surface decreases, so a load applied to the detected part can be detected by detecting the contact area. The true contact area and the rolling element load are in a proportional relationship. The movable element is preferably in a shape easily reflecting a change in the contact area such as a spherical shape, a columnar shape, a cylindrical shape, a conical shape, a barrel shape or others. The material of the movable element and the fixed element is usually metal, but any solid is acceptable.

If the movable element and the fixed element are metal, current flowing through a circuit including the detected part according to the electric resistance of the detected part varies depending on an increase or decrease in the contact area, so various electric resistance measuring devices or current sensors can be used as a contact area detection sensor. Further, an echo detected by an ultrasonic sensor varies depending on a change in the contact area, so an ultrasonic sensor can be used as a contact area detection sensor. With an ultrasonic sensor, a change in the contact area can be calculated even if the detected part is not metal. In any case, it is possible to reduce restrictions in selecting the material of the detected part, and to detect the load acting on the detected part without performing additional processing to the detected part.

The movable element may be a rolling element of a rolling bearing, and the fixed element may be a fixed ring of the rolling bearing. With this configuration it is possible to realize a rolling bearing device with a sensor capable of detecting a load acting on the bearing. Such a rolling bearing device with a sensor may be configured such that a fixed ring is mounted to the body side and a rolling ring is mounted to the wheel side so as to be used as a hub unit with a sensor.

As a rolling bearing, any rolling bearing such as a deep groove ball bearing, an angular ball bearing, a roller bearing, a needle bearing or a thrust bearing is usable, and is applicable not only to that of a single row but also to that of plural rows. The material of the bearing may be a magnetic material such as bearing steel of course, but it also may be non-magnetic metal or ceramics.

When the load acting on the rolling bearing changes, the contact area of the fixed ring and the rolling element charges corresponding to the load change. The relationship between the contact area and the load acting on the bearing can be calculated theoretically. Therefore, by previously calculating the relationship between the contact area and the sensor output experimentally, the load acting on the rolling bearing can be calculated from the sensor output. In this way, it is possible to calculate the load acting on the rolling bearing without performing processing to the detected part (contact surface of the fixed ring and the rolling element).

In this case, the processing means preferably includes: a theoretical formula storage for storing theoretical formulas showing a relationship between the rolling element load and the contact area; an empirical formula storage for storing empirical formulas showing a relationship between the sensor output and the contact area; a contact area calculation unit for calculating the contact area from the sensor output by using the empirical formulas; and a rolling element load calculation unit for calculating the rolling element load from the contact area by using the theoretical formulas. Further, the contact area detection sensor is preferably an ultrasonic sensor for measuring a change in the contact area as an echo of an ultrasonic wave. The ultrasonic sensor may be a general one (ultrasonic sensor with single vibrator) of course, but the ultrasonic sensor may include a plurality of vibrators aligned at a predetermined pitch (ultrasonic sensor of multiple vibrators).

The ultrasonic sensor may be mounted to the fixed ring of the rolling bearing, and when the fixed ring is supported by the housing or the like, the ultrasonic sensor may be held by the housing or the like so as to face the contact surface of the fixed ring and the housing or the like.

The rolling bearing can obtain the relationship between the rolling element load and the contact area easily with high accuracy, and when a change in the contact area is obtained by the ultrasonic sensor, the relationship between the sensor output and the contact area can be obtained easily with high accuracy. Further, detection of the contact surface by the ultrasonic sensor is excellent in that it is not limited to the case where the movable element and the fixed element are metal.

The contact area detection sensors are provided at, for example, four positions in total which are at the top, bottom, front and back parts of the rolling bearing, and three-directional force components of a load (up and down directional load, front and back directional load and left and right directional load) acting on the rolling bearing are calculated from these four data. Note that the sensors may be provided at four positions other than the above-described arrangement at equal distribution. In calculating the three-directional force components, the contact area detection sensors may be three while omitting one of those at the top and bottom parts, or may be three arranged at any positions on the circumference at equal distribution. Further, five or more sensors may be arranged at any positions on the circumference at equal distribution, and arrangement of the contact area detection sensors are not necessarily arranged at equal distribution. When only calculating an absolute value of the load, the contact area detection sensor may be one, and the number of contact area detection sensors is changed appropriately corresponding to the required load (including moment).

The rolling bearing device with sensors according to the present invention includes: a rolling bearing; a contact area detection sensor mounted to the rolling bearing; and processing means including an empirical formula storage, a theoretical formula storage, a contact area calculation unit, a rolling element load calculation unit, and a three-directional force component calculation unit.

The contact area detection sensor is an ultrasonic sensor which measures a change in the contact area with an echo of an ultrasonic wave, the theoretical formula storage stores theoretical formulas showing the relationship between the rolling element load and the contact area, and the empirical formula storage stores empirical formulas showing the relationship between the sensor output and the contact area. In the contact area calculation unit, the sensor output is converted into a contact area, and in the rolling element load calculation unit, the contact area is converted into a rolling element load, and in the three-directional force component calculation unlit the rolling element load is converted in three-directional force components (up and down directional load, front and back directional load and left and right directional load).

In other words, a first method of calculating a load from sensors is to calculate a contact area by using the relationship between the sensor output and the contact area stored on the empirical formula calculation unit, and to recalculate a rolling element load from the contact area and the relationship between the load and the contact area of the theoretical formulas, to thereby calculate the load from the sensor output. Here, the relationship between load and contact area (this "contact area" is different from the true contact area described above, and is an "apparent contact area") of theoretical formulas is well-known, and is as follows.

a: long radius of a contact ellipses and b: short radius of a contact ellipse for calculating an area πab of contact surface (ellipse) of a rolling element and a raceway groove of an outer ring are indicated as follows where the main curvatures of contact objects are $\rho_{1I}$, $\rho_{1II}$, $\rho_{2I}$, $\rho_{2II}$ (subscripts 1 and 2 show objects and subscripts I and II show planes including the main curvatures), the load is Q, and coefficients determined depending on a contacting state are μ and ν.

$$a = e_a (Q/\Sigma_\rho)^{1/3}$$

$$b = e_b (Q/\Sigma_\rho)^{1/3}$$

$$e_a = 0.02363\mu$$

$$e_b = 0.02363\nu$$

$$\Sigma\rho = \rho_{1I} + \rho_{1II} + \rho_{2I} + \rho_{2II}$$

provided that in the case of a contact between a ball and an inner ring, ball: $\rho_{1I} = \rho_{1II} = 2/DW$, and inner ring; $\rho_{2I} = -1/r1$, $\rho_{2II} = 2/F$.

In order to obtain a load from sensors, a second method is to calculate a rolling element load from the empirical relationship between sensor output and contact area (in this specification, a "contact area" other than the "(apparent) contact area") in the first embodiment mentioned above means a true contact area") and the empirical relationship between connect area and rolling element load. Comparing with the first method described above, this method is preferable in that the relationship between contact area and rolling element and the relationship between sensor output (echo ratio) and rolling element load become linear, so the accuracy is improved.

In order to calculate a load from sensors, a third method is to calculate a rolling element load directly from a sensor output without using a contact area. This method is to calculate rolling element load from sensor outputs (echo ratios) directly by linking the relationships of the second method mentioned above. This is further preferable in that the number of calculation works is reduced.

This rolling bearing device with sensors is so configured that the fixed side raceway member is to be mounted on the body side and the rotational side raceway member is to be mounted to the wheel side, and may be used as a hub unit with sensors of a motor vehicle.

A method of calculating three-directional force components in the rolling bearing device with sensors includes the steps of: emitting an ultrasonic wave from the contact area detection sensor to a contact surface of a rolling element and a raceway groove of the rolling bearing; in the contact area calculation unit, converting an output of an ultrasonic wave from the contact surface of the rolling element and the raceway groove in a contact area by using the relationship between the output and the contact area stored in the empirical formula storage; in the rolling element load calculation unit, converting the contact area obtained in the contact area computation unit into a rolling element load by using the relationship between the load and the contact area stored in the theoretical formula storage; and in the three-directional force component calculation unit, calculating three-directional force components by using the rolling element load obtained in the rolling element load calculation unit.

The rolling element load is calculated from an echo ratio obtained from the following equation for example.

echo ratio=100*(*H*0−*H*1)/*H*0

H0: echo reflection intensity when a rolling element moves away from the ultrasonic sensor by a half pitch H1: reflection echo intensity when a rolling element is positioned immediately below the ultrasonic sensor An equation for calculating a rolling element load may be set as the following temperature correction formula in order to reduce the temperature dependency.

echo ratio=100*(*H*0−*H*1)/*H*0*i*

H0: reflection echo intensity when a rolling element moves away from the ultrasonic sensor by a half pitch H1: reflection echo intensity when a rolling element is positioned immediately below the ultrasonic sensor H0$i$: reflection echo intensity when a rolling element at a prescribed temperature moves away from the ultrasonic sensor by a half pitch In the conventional definition of an echo ratio, the denominator is H0. In this temperature correction formula, however, "reflection echo intensity when a rolling element at a prescribed temperature moves away from an ultrasonic sensor by a half pitch", which is newly introduced, is used as the denominator. Although reflection echo intensities H0 and H1 in the ultrasonic sensor depend on the temperature, (H0-H1) does not depend on the temperature substantially. Therefore, according to this temperature correction formula, it is possible to prevent the temperature dependency from becoming high by dividing (H0-H1) not depending on the temperature by H0 depending on the temperature, whereby it is possible to utilize the correlation between the echo ratio and the load, and further, to eliminate temperature dependency.

In the case where the contact area detection sensor is an ultrasonic sensor, it is possible to simplify the configuration of the processing means of the rolling bearing device with a sensor (reduction of the number of calculation works), and the rolling bearing device with a sensor includes: a rolling bearing; an ultrasonic sensor; and processing means having an empirical formula storage for storing a relationship between an echo ratio previously measured by using the ultrasonic sensor and a rolling element load, a rolling element load calculation unit for calculating the rolling element load from the echo ratio, and a three-directional force component calculation unit from the rolling element load.

Further, a rolling bearing device with sensors according to this invention is so configured that in a rolling bearing device with sensors including a rolling bearing having a fixed side raceway member, a rotational side raceway member, and rolling elements, and a sensor device, wherein the sensor device includes: ultrasonic sensors, provided at least two positions having a prescribed interval in a peripheral direction of the fixed side raceway member, for detecting a rolling element load (force acting between the rolling element and the fixed side raceway member) as an echo ratio; and a processing means for calculating at least an up and down directional component and a left and right directional component among three-directional force components of a load acting on the rolling bearing from outputs of respective ultrasonic sensors.

It is preferable that the ultrasonic sensor includes, for example, a cylindrical case having an external thread formed on an outer periphery thereof and a vibrator disposed inside the case, and the external thread of the case be screwed into an internal thread with a bottom provided in the fixed side raceway member whereby a prescribed preload is set at the tip of the case. Since the intensity of a reflection echo obtained in the ultrasonic sensor varies depending on the way of mounting sensors, roughness of the mounting face, difference in couplant, and pressing forces of sensors, so by changing the screwing amount of the external thread, the reflection echo intensity at a prescribed part can be set to a prescribed value, whereby the accuracy of the load detection can be improved. The ultrasonic sensor can be mounted by means of various methods capable of setting the reflection echo intensity to a prescribed value. For example, the ultrasonic sensor may include a cylindrical case with a flange part for being mounted to the fixed side raceway member and a vibrator disposed inside the case, and a bolt inserted from a bolt insertion hole provided in the flange part may be screwed into an internal thread with a bottom provided in the fixed side raceway member whereby a prescribed preload is set at the tip of the case.

It is more preferable that a nut for stopping rotation of the case be screwed in the base end part of the external thread of the case of the ultrasonic sensor, and an O ring be interposed between the nut and the fixed side raceway member for preventing immersion of water into the internal thread. With this configuration, the property can be maintained even mounting the sensor at a position where vibration is large and water is easily immersed from the outside as a hub unit for a motor vehicle.

When trying to detect a rolling element load by a typical ultrasonic sensor with a single vibrator, an echo ratio (or echo intensity) depends not only on a bearing load but also on a position of the rolling element relative to the sensor. Therefore, even if the bearing load is same, the echo ratio changes depending on the position of the rolling element. When a change in the bearing load is not large and the rotational speed is fast, no problem will arise in detecting accuracy of the rolling element load even in an ultrasonic sensor with a single vibrator, but when a change in the bearing load is large and the rotating speed is slow, a problem may arise in detecting the rolling element load by the ultrasonic sensor with a single vibrator. The critical load variable frequency which can be detected increases in proportion to the number of vibrators. Therefore, when the change in the bearing load is large and the rotational speed is slow, a use of multiple vibrators is effective, whereby a dynamic load which changes largely can be detected with high accuracy.

An ultrasonic sensor with multiple vibrators is, for example, one having a cylindrical case with an external thread formed on the outer periphery thereof and a plurality of vibrators disposed inside the case, and the external thread of the case is screwed into an internal thread with a bottom provided in the fixed side raceway member, whereby a prescribed preload is set as the tip of the case.

In the ultrasonic sensor with multiple vibrators, the vibrators may be arranged at an equal pitch. In such a case, it is preferable that the pitch of the vibrator multiplied by a number of vibrators equal one pitch of the roiling element. One pitch of the rolling element may be based on the angle (one pitch of rolling element=360°/number of rolling elements), or based on the length in a peripheral direction (one pitch of rolling element=P.C.D. of rolling element/number of rolling elements). With a plurality of vibrators aligned at an equal pitch, when one rolling element passes through the ultrasonic sensor, the number of signals (pulse number signals) same as the number of vibrators are outputted, whereby the resolution improves. Further, instead of an equal pitch, intervals between adjacent vibrators may be shifted with a certain increment.

If the rolling bearing is a hub unit for a motor vehicle, it is preferable that the following equations (1) are provided in the processing means as equations for calculating a load acting on the hub unit from rolling element loads.

$$f1 = a + bFy + cFz + dMx$$

$$f2 = a + bFy + cFx + dMz$$

$$f3 = a + bFy - cFz - dMx$$

$$f4 = a + bFy - cFx - dMz$$

$$f5 = a - bFy + cFz - dMx$$

$$f6 = a - bFy + cFx - dMz$$

$$f7 = a - bFy - cFz + dMx$$

$$f8 = a - bFy - cFx + dMz \quad \text{equations (1)}$$

where a is rolling element load by preload of the hub unit, b, c, d are coefficients not depending on external force, Fx Fy, Fz are respectively front and back (x axis) directional components left and right (y axis) directional component and up and down (z axis) directional component of a load, Mx and Mz are moments about x axis and z axis, and f1 to f8 are rolling element loads at respective sensor positions.

The relationship between rolling element load and external force acting on the hub unit can be calculated based on the bearing calculation theory, and the relationship between the rolling element load and external force acting on the hub unit has an almost linear relationship. The above-mentioned equations (1) have been obtained by performing multiple analyses based on the theoretical calculation result.

Note that components in the respective axial directions (three-directional force components) and moments about the respective axes (three-directional moments) of a load will be collectively called as "six force components" below.

The six force components can be calculated with high accuracy by using the relationships of the equations (1) above. The number of sensors and configurations of the processing means may be coped with in various manners while considering a cost increase associating with an increase in the number of sensors. In particular, when the rolling bearing device with sensors of the present invention is applied to a hub unit for a motor vehicle, the following configuration of the processing means is possible by adding equations established for a wheel.

For example, it is assumed that the number of sensors is two, and the processing means calculates an up and down directional component and a left and right directional component of the load acting on the rolling bearing from appropriate two equations among the equations (1) and the following equation (2).

$$Mx = r*Fy + e*Fz \quad \text{equation (2)}$$

where r is wheel rolling radius, and e is difference between acting point of Fz and center of the hub unit in an y axial direction.

Further, it is assumed that the number of sensors is four, and the processing means calculates the six force components acting on the rolling bearing from appropriate four equations among the equations (1), the equation (2) and the following equation (3).

$$My = r*Fx \quad \text{equation (3)}$$

where My is moment about y axis.

Note that the above-described equations (1) are equations showing the relationship between rolling element loads and external force acting on the hub unit, so the relationship between rolling element loads and echo ratios obtained by the ultrasonic sensors are calculated to thereby calculate the relationship between external force acting on the hub unit and echo ratios. That is, two correlations must be calculated, so an error may become large. Instead of this, a load acting on the rolling bearing may be calculated by using echo ratios measured by the ultrasonic sensors, and as equations therefor, the following equations (4) to (6) may be provided in the processing means.

$$j1 = k + lFy + mFz + NMx$$

$$j2 = k + lFY + mFx + nMz$$

$$j3 = k + lFY - mFz - nMx$$

$$j4 = k + lFy - mFx - nMz$$

$$j5 = k - lFy + mFz - nMx$$

$$j6 = k - lFY + mFX - nMz$$

$$j7 = k - lFy - mFz + nMx$$

$$j8 = k - lFy - mFx + nMz \quad \text{equations (4)}$$

$$Mx = r*FY + e*Fz \quad \text{equation (5)}$$

$$My = r*Fx \quad \text{equation (6)}$$

where k is echo ratio by preload of the hub unit, l, m, n respectively are coefficients not depending on external force, Fx, Fy, and Fz respectively are front and back (x axis) directional component, left and right (y axis) directional component and up and down (z axis) directional component of load, Mx, My, and Mz are moments about x axis, y axis and z axis, j1 to j8: echo ratios at respective sensor positions, r is wheel rolling radius, e is difference between acting point of Fz and center of the hub unit in an y axial direction.

EFFECT OF THE INVENTION

The sensor device of the present invention includes: a detected part including a movable element and a fixed element contacting each other in which a contact area of the both elements changes corresponding to an external load; a contact area detection sensor, provided to the fixed element, for detecting the contact area of the detected part; and a processing means for calculating the external load from an sensor output by using a correlation between the external load and the contact area. Therefore, when detecting the load acting on the rolling bearing for example, it is possible to reduce restrictions in selecting the material of the detected part and to make additional processing of the detected part unnecessary.

According to the rolling bearing device with sensors of the present invention, it is possible to calculate three-directional force components acting on the rolling bearing by reducing restrictions in selecting the material of the rolling bearing and making additional processing unnecessary. Therefore, when this is applied to a hub unit with sensors of a motor vehicle, three directional force components of a tire ground contact load can be calculated, which leads to an improvement in the accuracy of vehicle control.

BRIEF DESCRIPTION OF THE DRAWINGS

FIG. 6 is a cross-sectional view showing a first embodiment of the rolling bearing device with sensors according to the present invention.

Figure 1:
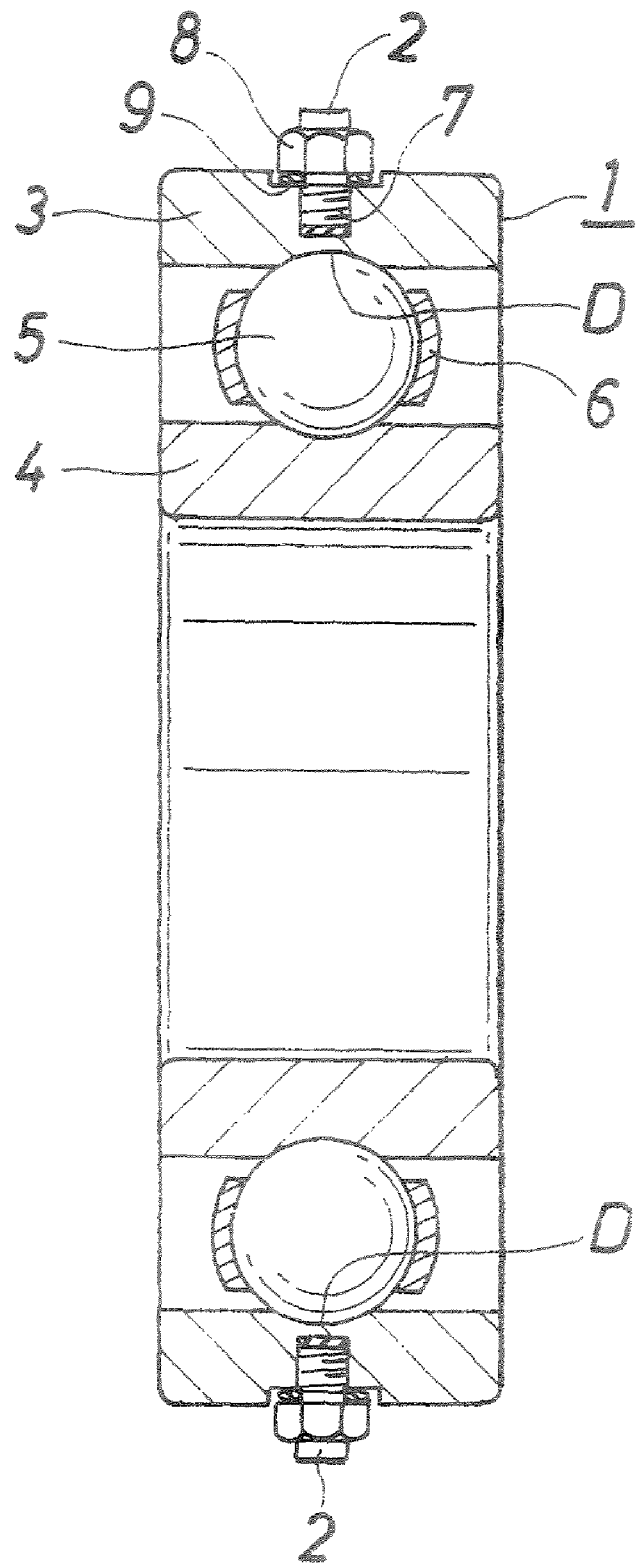
FIG. 1 is a cross-sectional view showing a first embodiment of a sensor device according to the present invention.

DESCRIPTION OF REFERENCE NUMERALS (1) rolling bearing
(2) ultrasonic sensor (contact area detection sensor)
(3) fixed side raceway member (fixed element)
(3*b*) internal thread
(3*c*) internal thread
(4) rolling side raceway member
(5) rolling element (movable element)
(10) processing means
(11) experimental storage
(12) theoretical storage
(13) contact area calculation unit
(14) rolling element load calculation unit
(21) hub unit (rolling bearing)
(22) sensor device
(23) fixed side raceways member
(24) rolling side raceway member
(25) roiling element (ball)
(31) case
(31*a*) external thread
(32) vibrator
(50) ultrasonic sensor
(50*b*) vibrator
(61) case
(61*a*) flange part
(62) vibrator (Sti) (Sbi) (Sto) (Sbo) ultrasonic sensor
(D) contact surface (detected part)

BEST MODE FOR CARRYING OUT THE INVENTION

An embodiment of the present invention will be explained in the following, with reference to the drawings.

FIG. 1 shows a first embodiment of a rolling bearing device with sensors having a sensor device of this invention. In the explanation below left and right and up and down mean left and right and up and down of the drawings.

Figure 2:
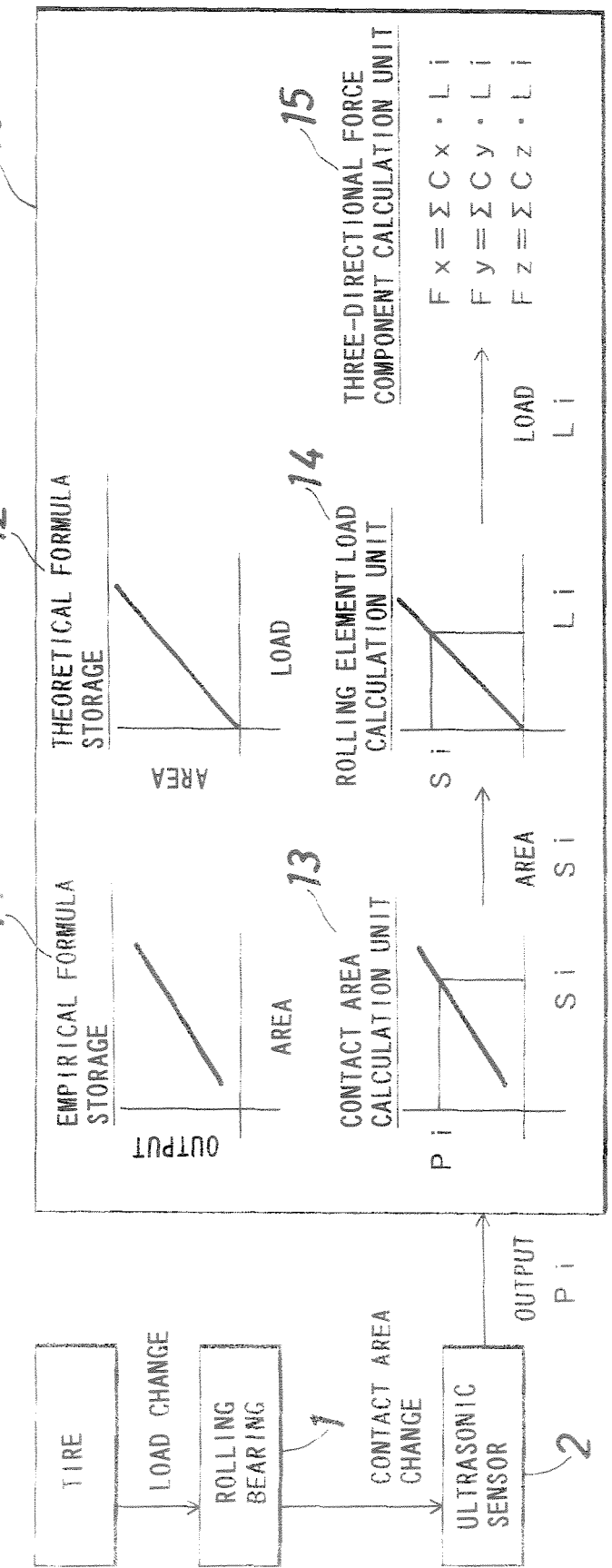
FIG. 2 is a block diagram showing the configuration of a processing means of the sensor device according to this invention.

As shown in FIGS. 1 and 2, a rolling bearing device with sensors includes: a rolling bearing (1); contact area detection sensors (2) attached to the rolling bearing (1); and a processing means for processing outputs of the contact surface detection sensors (2) (not shown in FIG. 1, see FIG. 2).

The rolling bearing (1) includes an outer ring (fixed element (3), an inner ring (4), a plurality of rolling elements (movable elements) disposed between them (5), and a cage (6). Although not shown, the outer ring (3) is fixed to the housing or the like, and to the inner ring (4), a rolling shaft and the like is fixed. The outer ring (3) and the housing may be integrally formed.

The contact area detection sensor (2) is an ultrasonic sensor calculating the echo of an ultrasonic wave by receiving, with a receiving unit, a reflection wave of the ultrasonic wave outputted from a vibrator. The ultrasonic sensor (2) includes a cylindrical case (7) with an external thread formed on the outer periphery thereof and a vibrator (not shown) disposed inside the case, and faces the contact surface (detected part) (D) between the rolling element (5) and the raceway groove of the outer ring (3) from a perpendicular direction. The outer ring (3) is provided with an internal thread with a bottom so as to make the screwed amount of the external thread of the case (7) adjustable. The external thread of the case (7) is screwed with a nut (8) for stopping the rotation of the case (7), and an O ring (9) is interposed between the nut (8) and the outer ring (3). An output of the ultrasonic sensor is calculated as an echo ratio shown below.

$$\text{Echo ratio} = 100 * (H0 - H1)/H0$$

H0: reflection echo intensity when a rolling element moves away from the ultrasonic sensor by a half pitch H1: refection echo intensity when a rolling element is positioned immediately below the ultrasonic sensor When the load acting on the rolling element is large the contact area becomes large and the reflection wave becomes small. Therefore, when the contact area is large, a large echo ratio is outputted.

The ultrasonic sensors (contact area detection sensors) (2) are also provided on a front part of the outer ring and a back part of the outer ring in addition to the top of the outer ring and the bottom of the outer ring shown in the figure. From outputs of these four sensors, three-directional force components (up and down directional load, front and back directional load, and left and right directional force) of the load acting on the rolling hearing (1) are calculated.

As shown in FIG. 2, the processing means (10) includes: an empirical formula storage (11) for storing empirical formulas showing relationships between the output (echo ratio) of the ultrasonic sensor (2) and the contact area; a theoretical formula storage (2) for storing theoretical formulas showing the relationship between the rolling element load and the contact area; a contact area calculation unit (13) for calculating the contact area from outputs of the ultrasonic sensors (2) by using a empirical formulas; a rolling element load calculation unit (14) for calculating the rolling element load (rolling element load at each sensor position) from the contact area by using theoretical formulas; three-directional force components calculation unit (1) for calculating three-directional force components (up and down directional load, front and back directional load, left and right directional load) acting on the rolling bearing (1) by using the rolling element loads calculated from the respective ultrasonic sensors (2).

When the load acting on the rolling bearing (1) changes, the contact area of the rolling element (5) and the raceway groove of the outer ring (3) changes, whereby the output of the ultrasonic sensor (2) changes. The output Pi of the ultrasonic sensor (2) is converted into an area Si by using the relationship between sensor output and area stored on the empirical formula storage (11), in the contact area calculation unit (13). Next, this contact area Si is converted into a load Li by using the relationship between load and area stored on the theoretical formula storage (12). Then, in the three-directional force components calculation unit (15), three-directional force components are calculated by using a plurality of rolling element loads Li obtained from the respective ultrasonic sensors (2). A arithmetic expression of three-directional force components is previously obtained through experimentations.

The relationship between rolling element load and contact area stored on the theoretical formula storage (12) can be obtained logically in the following manner. That is, a: long radius of a contact ellipse and b: short radius of the contact ellipse, for calculating an area πab of the contact surface (ellipse) between the rolling element (5) and the raceway groove of the outer ring (3), will be shown as follows, where main curvatures of contact objects are $\rho_{1I}$, $\rho_{1II}$, $\rho_{2I}$, $\rho_{2II}$ (subscripts 1, 2 indicate objects, and subscripts I, II indicate planes including the main curvatures) a load is Q, and coefficients determined depending on the contacting state are μ and ν.

$a = e_a(Q/\Sigma\rho)^{1/3}$ $b = e_b(Q/\Sigma\rho)^{1/3}$ $e_a = 0.02363\mu$ $e_b = 0.02363\nu$ $\Sigma\rho = \rho_{1I} + \rho_{1II} + \rho_{2I} + \rho_{2II}$ In the case of a contact between a ball and an inner ring, ball: $\rho_{1I} = \rho_{1II} = 2/Dw$, and inner ring: $\rho_{2I} = -1/r1$, $\rho_{2II} = 2/F$.

Figure 3:
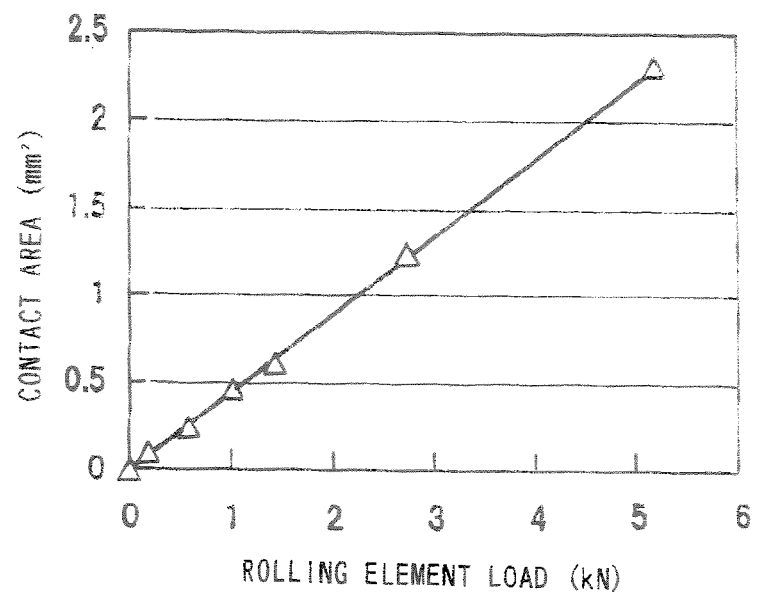
FIG. 3 is a graph showing the relationship (theoretical formula) between a rolling element load and a contact area.

Therefore, the relationship between the contact area πab and the load Q can be obtained from these formulas. FIG. 3 shows this relationship.

Figure 4:
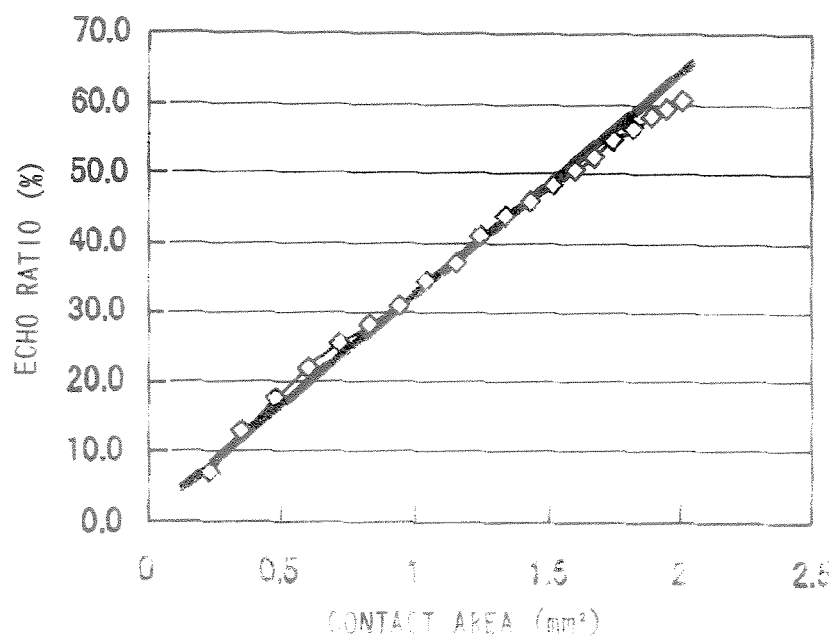
FIG. 4 is a graph showing the relationship (empirical formula) between a contact area and an echo ratio of an ultrasonic sensor.

FIG. 4 shows the relationship between contact area and echo ratio when an ultrasonic measuring method using the ultrasonic sensor (2) is used, in which y=ax is established, where y: echo ratio, x: contact area, and a: regression coefficient. The relationship between sensor output (echo ratio) and contact area of the ultrasonic sensor (2) obtained in this manner is stored on the empirical formula storage (11). Thereby, by using y=ax, contact area can be calculated from echo ratio. Although the relational expression between echo ratio and contact area shown in FIG. 4 can be a straight line, the empirical formula is not limited to a straight line.

Figure 5:
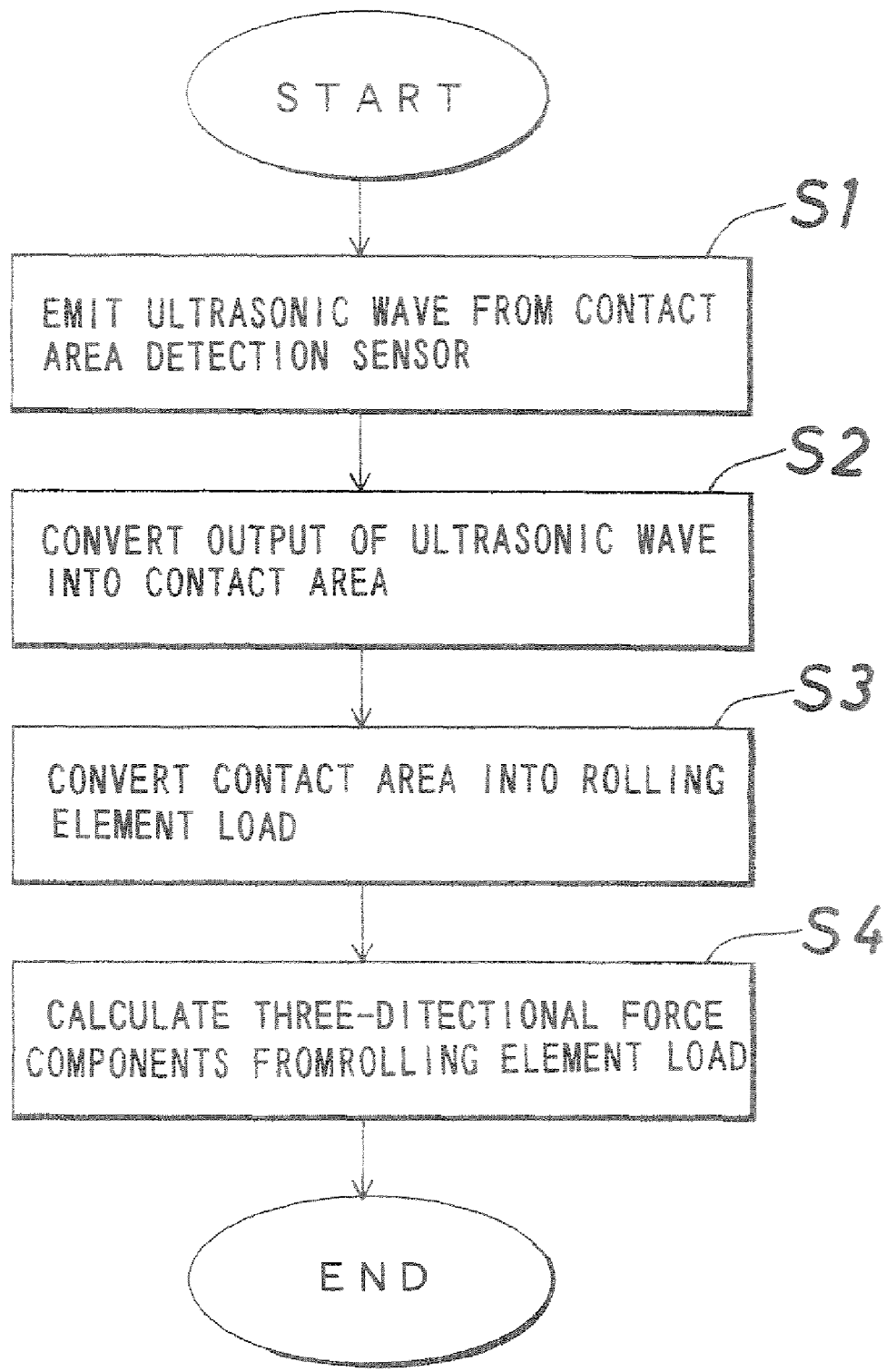
FIG. 5 is a flowchart for explaining a method of calculating three-directional force components in a rolling bearing device with sensors according to the present invention.

FIG. 5 is a flowchart showing a method of calculating three-directional force components of a rolling bearing load (e.g., tire ground contact load applied on the hub unit) which is an example of processing performed in the processing means (10) shown in FIG. 2 of the rolling bearing device with sensors. Next, an example of processing will be shown with reference to this flowchart.

In FIG. 5, in calculating three-directional force components of the rolling bearing load, first an ultrasonic wave is emitted from the contact area detection sensor (2) to the contact surface (D) of the rolling element (5) and the raceway groove of the rolling bearing (1) (step S1). Then, in the contact area calculation unit (13) of the processing means (10), an output of ultrasonic wave from the contact surface (D) of the rolling element (5) and the raceway groove is converted into a contact area by using the relationship between output and contact area stored on the empirical formula storage 11 (step S2), and then in the rolling element load calculation unit (14), the contact area obtained in the contact area calculation unit (13) is converted into a rolling element load by using the relationship between load and contact area stored on the theoretical formula storage (12) (step S3), and then in the three-directional force component calculation unit (15), three-directional force components of the rolling bearing (1) is calculated by using the rolling element load obtained in the rolling element load calculation unit (14) (step S4). By using the rolling radius of wheel, moments in three directions (moment about up and down axis, moment about front and back axis, moment about left and right axis) can also be calculated from the three-directional force components.

Figure 13:
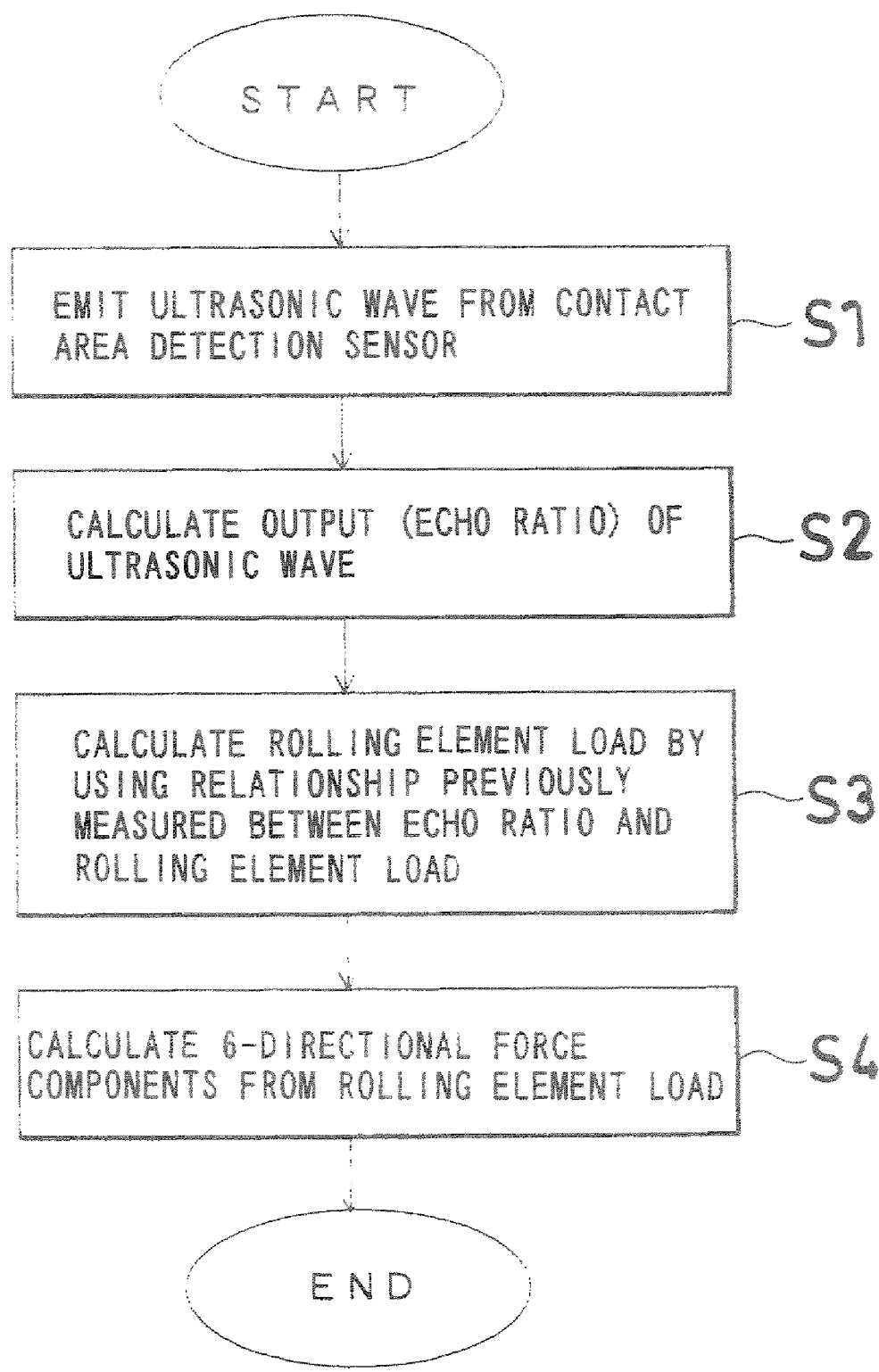
FIG. 13 is a flowchart for explaining another embodiment of a method of calculating three-directional force components in the rolling bearing device with sensors according to the present invention.

With the rolling element load previously calculated from the sensor output (echo ratio), calculation of three-directional force components can be performed by the steps shown in FIG. 13. That is, when ultrasonic waves are emitted from the ultrasonic sensors (Sti) (Sbi) (Sto) (Sbo) to the contact surfaces (D) of the rolling elements (5) and the raceway groove of the rolling bearing (1) (step S1) and outputs from the ultrasonic sensors (Sti) (Sbi) (Sto) (Sbo) are calculated (step S2), in the rolling element load calculation unit (14) of the processing means (10), the rolling element load is calculated by using the relationship between echo ratio and rolling element load previously measured (step 3), and in the three-directional force component calculation unit (15) of the processing means (10) six-directional force components (three-directional loads and three-directional moments) are calculated from the rolling element load (step 4). In this way, it is possible to directly calculate three-directional or six-directional force components from sensor outputs (echo ratios) without performing conversion in the theoretical formula storage (12), whereby the number of works of calculation can be reduced.

Note that although the above-described embodiment has shown the case that the sensor device is mounted to the ball bearing so as to be used as a rolling bearing device with sensors, the sensor device according to this invention can be used by being combined with those other than a rolling bearing. Further, of course it can be used for a rolling bearing other than a ball bearing or a hub unit for a motor vehicle which is an application of a rolling bearing. Further, the ultrasonic sensor may have a single vibrator or multiple vibrators.

Hereinafter, one example of applying the sensor device to a hub unit of a motor vehicle will be explained.

Figure 7:
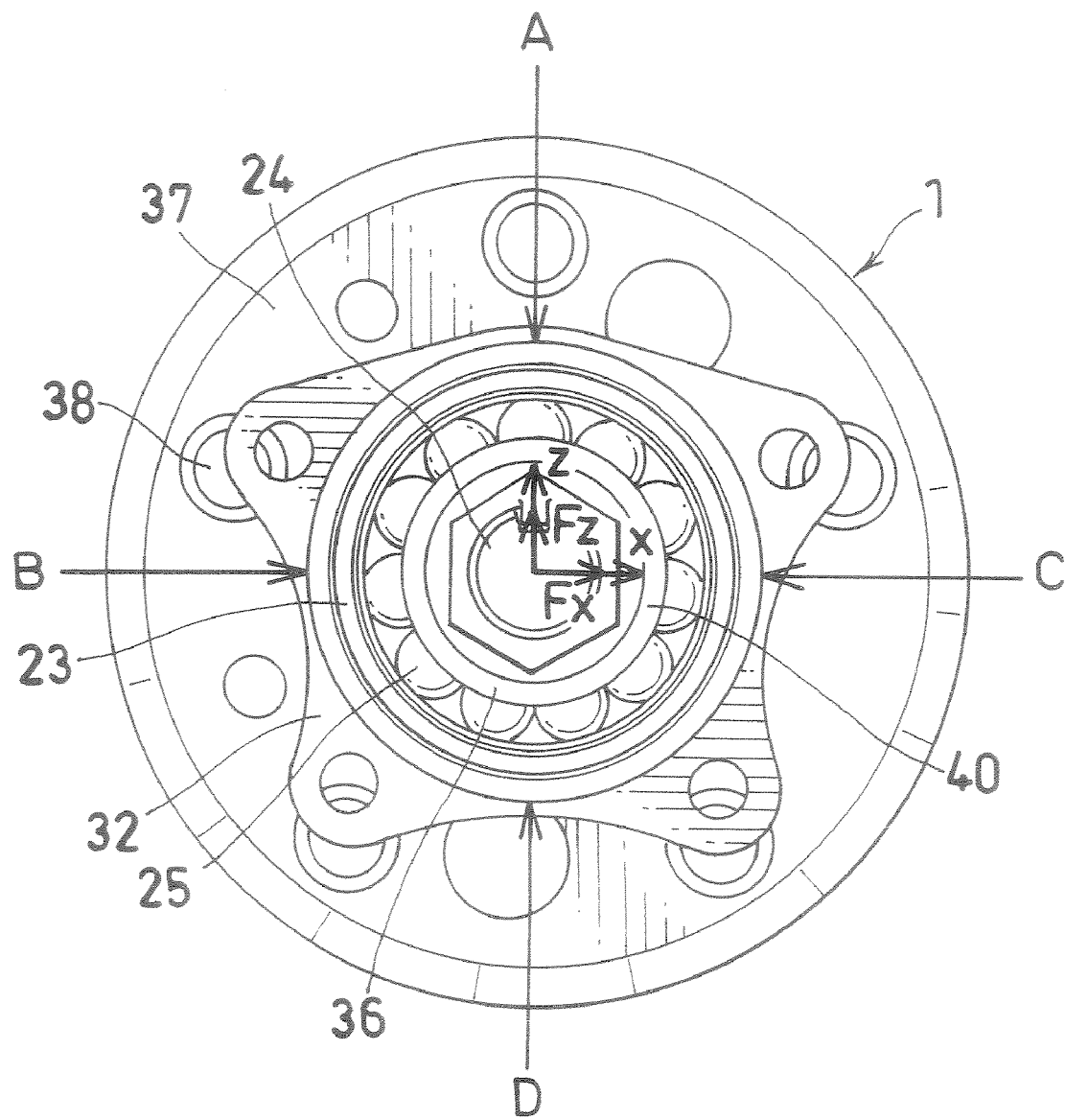
FIG. 7 is a side view thereof.
Figure 8:
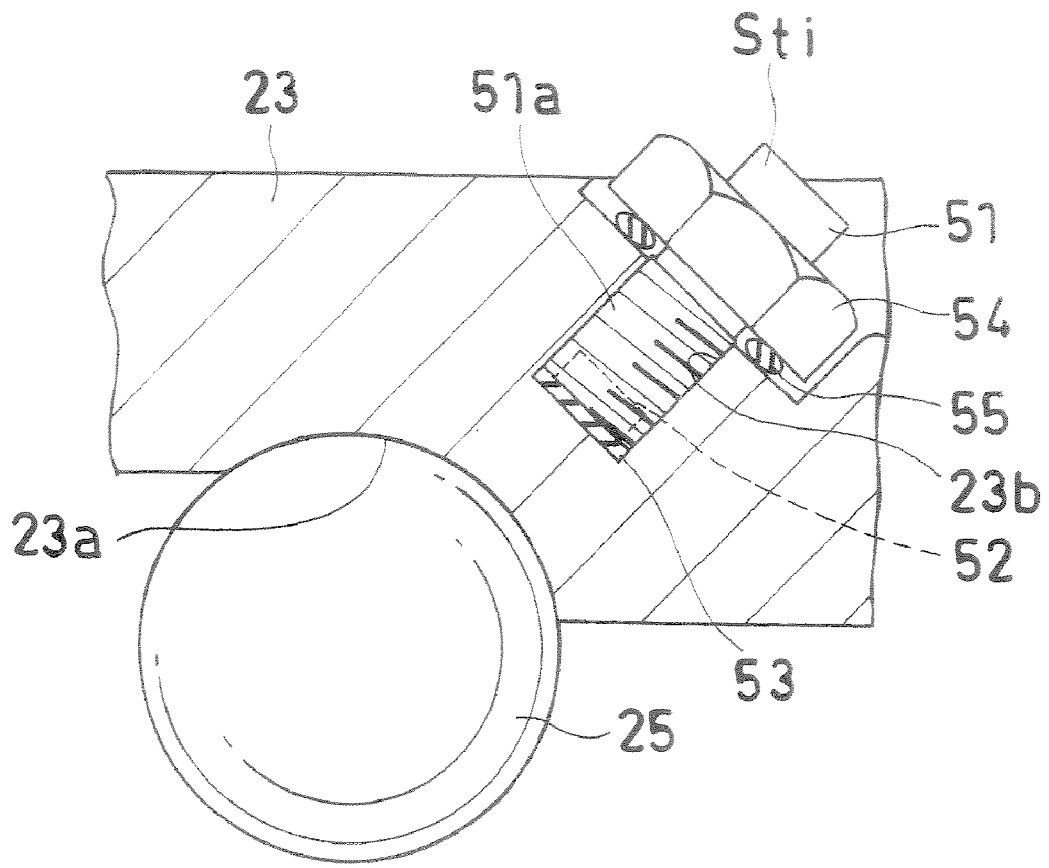
FIG. 8 is a cross-section view of the main part of FIG. 6 showing the mounting structure of an ultrasonic sensor.

A rolling bearing device with sensors shown in FIGS. 6 to 8 is used as a hub unit with a sensor for a motor vehicle, and consists of a hub unit (21) for a motor vehicle and a sensor device (22). In the explanation below, left and right means the left and right of FIG. 6. Note that the inside of the vehicle is on the left, and the outside of the vehicle is on the right.

The hub unit (21) includes: a fixed side raceway member (23) fixed to the body side, a rotational side raceway member (24) to which a wheel is mounted, a plurality of rolling elements (balls) (25) arranged in two rows between the both members (23) (24), and cages (26) which holds the rolling elements (25) of the respective rows.

The fixed side raceway member (23) has an outer ring (fixed ring) function of the bearing, which includes: a cylindrical part (31) in which two rows of outer ring raceways are formed on the inner peripheral face; and a flange part (32) provided near the left end part of the cylindrical part (31) and to be mounted on a suspension system (body side part) with bolts.

The rotational side raceway member (24) consists or: an inner shaft (33) having a large diameter part (34) with a first raceway groove (34*a*) and a small diameter part (35) having a smaller outer diameter than the diameter of the first raceway groove (34*a*); and an inner ring (36) fitted to the outer diameter of the small diameter part (35) of the inner shaft (33), in which the right surface closely contacts the left surface of the large diameter part (34) of the inner shaft. Near the right end of the inner shaft (33), a flange part (37) is provided to which a plurality of bolts (38) for mounting a wheel are fixed. In the right part of the inner ring (36), a raceway groove (36*a*) is formed parallel to the raceway groove (34*a*) of the inner shaft (33). In between the right end part of the fixed side raceway member (23) and the inner shaft (33), a sealing device (39) is provided. On the left end part of the small diameter part (35) of the inner shaft (33), an external thread is provided, and the inner ring (36) is fixed to the inner shaft (33) with a nut (40) screwed to the external thread. The left end part of the fixed side raceway member (23) is provided with a cover (41) thereon. Although not shown, the fixing method of the inner ring and the inner shaft may be caulking by plastic-deforming the end part of the inner shaft.

Figure 12:
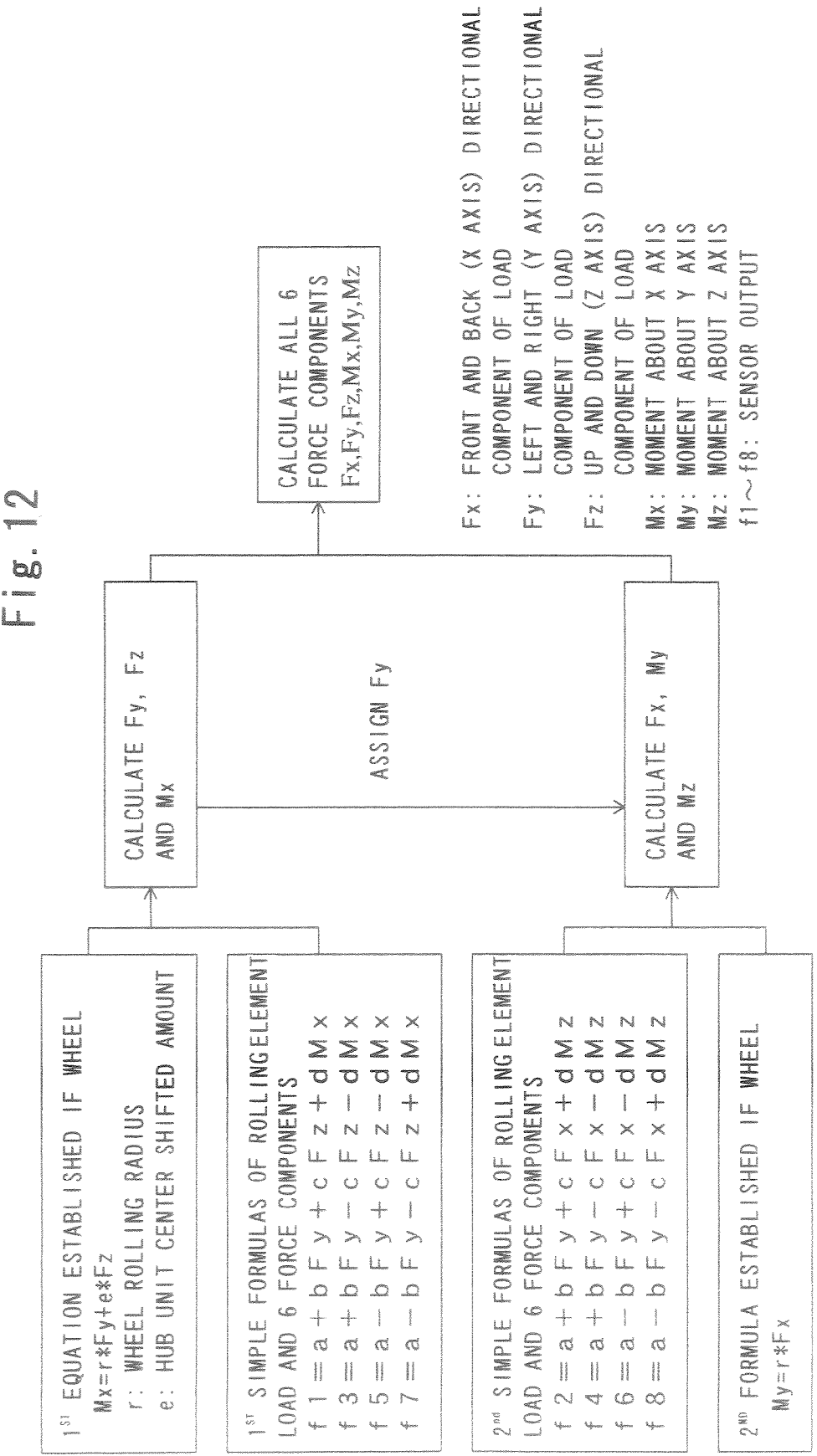
FIG. 12 is a block diagram showing a processing means of the rolling bearing device with sensors according to the present invention.

The sensor device (22) includes: multi-vibrator ultrasonic sensors (Sti) (Sbi) which detect force (rolling element load) acting between the fixed side raceway member (23) and the rolling elements (25) of the inner row; ultrasonic sensors (Sto) (Sbo) which detect rolling element loads of the rolling elements (25) of the outer row; and a processing means (see FIG. 12) for processing outputs of the ultrasonic sensors (Sti) (Sbi) (Sto) (Sbo).

The ultrasonic sensors (Sti) (Sto) (Sbi) (Sbo) are provided at a position of the back side=back part of the intermediate part in an up and down direction of the body side raceway member (3) (the position indicated by B in FIG. 7), and a position of the front side=front part of the intermediate part in the up and down direction of the body side raceway member (3) (the position indicated by C in FIG. 7), respectively, in addition to a position of the uppermost part=top part (Sti) (Sto) of the body side raceway member (3) shown in FIG. 6 (the position indicated by A in FIG. 7) and a position of the lowermost part=bottom part (Sbi) (Sbo) of the body side raceway member (3) (the position indicated by D in FIG. 7), at which those shown in FIG. 6 are provided. However, the number of ultrasonic sensors and the arrangements thereof are not limited to this configuration.

As shown in FIG. 8 (one inside the top is shown), the ultrasonic sensor (Sti) (Sto) (Sbi) (Sbo) includes a cylindrical case (51) in which an external thread (51*a*) is formed on the outer periphery and a vibrator (52) disposed inside the case (51), and faces the contact surface of the ball (5) and the raceway groove (3*a*) of the fixed side raceway member (3) from a right angular direction. The fixed side raceway member (3) is provided with an internal thread (3*b*) with a bottom, whereby the screwed amount of the external thread (51*a*) of the case (51) is adjustable. In between the tip face of the case (51) and the bottom face of the internal thread (3*b*), a rubber cushion sheet (53) is interposed so as to protect the tip part of the ultrasonic sensor (Sti). To the base end side part of the external thread (51*a*) of the case (51), a nut (54) for stopping rotation of the case (51) is screwed, and an O ring (55) for preventing immersion of water into the internal thread (3*b*) is interposed between the nut (54) and the fixed side raceway member (3).

Figure 9:
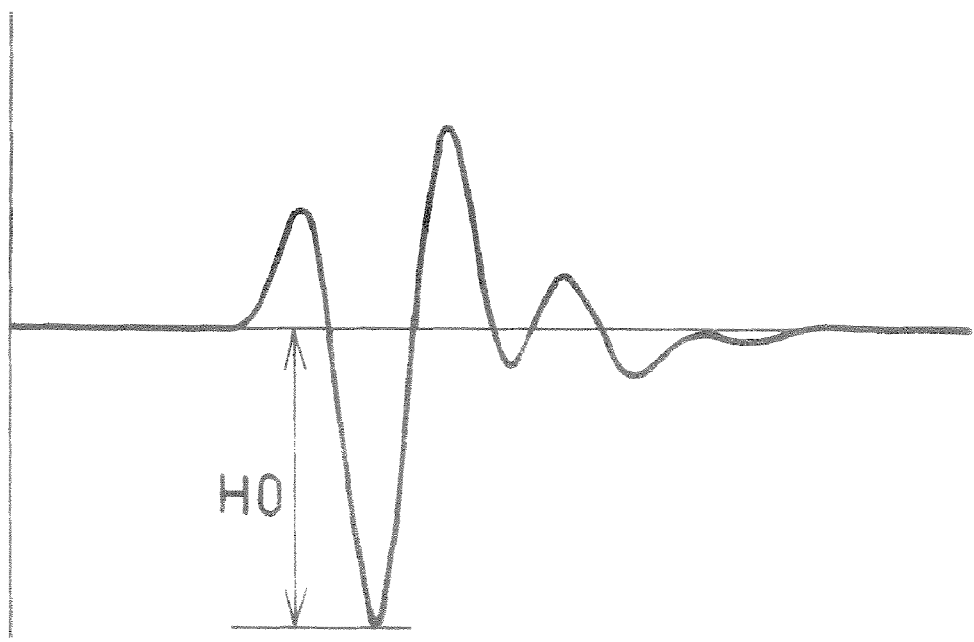
FIG. 9 is a chart showing an exemplary waveform of echo obtained in an ultrasonic sensor.

The ultrasonic sensor (Sti) (Sto) (Sbi) (Sbo) receives a reflection wave of ultrasonic wave outputted from a vibrator with the receiving unit and calculates reflection echo as shown in FIG. 9. An output thereof is calculated as an echo ratio shown below.

Echo ratio=100*($H0-H1$)/$H0$ $H0$: reflection echo intensity when rolling element moves away from the ultrasonic sensor by a half pitch $H1$: reflection echo intensity when rolling element is positioned immediately below the ultrasonic sensor The echo ratio has a relationship shown in FIG. 11 with rolling element load, and by using the relationship, rolling element load can be calculated from the echo ratio. When the load acting on the rolling element (25) is large, the contact area becomes large so that a reflection wave becomes small, so when the rolling element load is large, a large echo ratio is outputted.

Note that an echo ratio may be calculated as follows so as to prevent temperature dependency.

Echo ratio=100*($H0-H1$)/$H0i$ $H0$: reflection echo intensity when rolling element is moves away from the ultrasonic sensor by a half pitch $H1$: reflection echo intensity when rolling element is positioned immediately below the ultrasonic sensor $H0i$: reflection echo intensity when rolling element at a predetermined temperature moves away from the ultrasonic sensor by a half pitch In accordance with speed variations and posture variations of a traveling vehicle, the ground contact load applied to a tire varies. Corresponding to the tire ground contact load variations, the rolling element load varies. In the case of providing a plurality of sensors, the degree of influence placed on sensors differs depending on components of the front and back load, left and right load and vertical load acting on the tire. Therefore, by previously calculating the rolling element load when a front and back load is applied and an echo ratio corresponding thereto, the rolling element load when a left and right load is applied and an echo ratio corresponding thereto, and the rolling element load when a vertical load is applied and an echo ratio corresponding thereto, three-directional force components of the tire ground contact load can be calculated from echo ratios obtained in the ultrasonic sensors (Sti) (Sto) (Sbi) (Sbo).

The processing means of the sensor device (2) stores formulas of echo ratios, formulas for calculating rolling element loads of sensor positions from echo ratios obtained from the respective ultrasonic sensors (Sti) (Sto) (Sbi) (Sbo), formulas for calculating an up and down directional component, a front and back directional component and a left and right directional component of a tire ground contact load from the rolling element load, and the like.

In the case where sensors are provided at a plurality of positions so as to calculate respective components or force of ground contact load separately, an error affected by other components will be caused easily. However, with eight disposing positions of the ultrasonic sensors (Sti) (Sto) (Sbi) (Sbo) in total, that is, positions inside and outside the top part, the bottom part, the front part and the back part of the fixed side raceway member (3), it is possible to calculate three-directional force components with high accuracy, and to calculate a moment about the front and back axis and a moment about an up and down axis.

Figure 10:
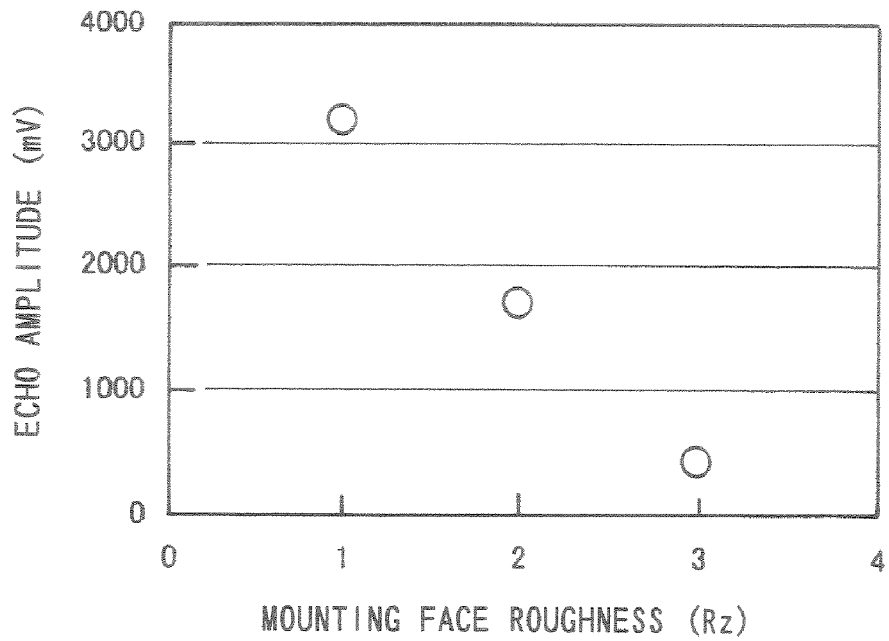
FIG. 10 is a graph showing the relationship between echo amplitude obtained in an ultrasonic sensor and the roughness of a mounting surface.

The intensities of reflection echo (echo amplitude) obtained in the ultrasonic sensors (Sti) (Sto) (Sbi) Sbo) vary depending on differences in disposing way of sensors, roughness of mounting surfaces, and couplant. FIG. 10 shows a relationship between the roughness of mounting surface and echo amplitude. From this graph, it is found that the echo amplitude becomes smaller as the mounting surface becomes rough. Further, the intensity of echo varies depending on the pressing force of a sensor. Therefore, the relationship between an echo ratio and a rolling element load differs for each ultrasonic sensor (Sti) (Sto) (Sbi) (Sbo), which may cause lower accuracy in detecting tire ground contact load.

According to the ultrasonic sensor (Sti) shown in FIG. 8, the pressing force of the sensor (Sti) may be changed by changing the screwed amount of the external thread (31a) of the case (31). Therefore, the reflection echo intensity H0 can be changed to be set to a predetermined value by performing fine adjustment of the screwed amount while watching the echo waveform shown in FIG. 9. Thereby, differences in the relationships between the echo ratios and the rolling element loads of the respective ultrasonic sensors (Sti) (Sto) (Sbi) (Sbo) can be suppressed so as to improve the accuracy in detecting the tire ground contact load.

Although, the number of sensors has been set to eight in total the above description, the number of sensors is not limited to this. As the number of sensors increase, the cost also increases correspondingly. Therefore, it is also required to consider obtaining useful data as much as possible while reducing the number of sensors. Methods of detecting load by using less number of sensors (a case of obtaining two-directional load components with two sensors and a case of obtaining three-directional load components with four sensors) will be shown below (see FIG. 12).

First, the relationship between a rolling element load at the time of a load calculated based on the bearing calculation theory and external force (loads and moments) acting on the hub unit can be expressed by the following equations.

$$f1 = a + bFy + cFz + dMx$$

$$f2 = a + bFy + cFx + dMz$$

$$f3 = a + bFy - cFz - dMx$$

$$f4 = a + bFy - cFx - dMz$$

$$f5 = a - bFy + cFz - dMx$$

$$f6 = a - bFy + cFx - dMz$$

$$f7 = a - bFy - cFz + dMx$$

$$f8 = a - bFy - cFx + dMz \qquad \text{equations (1)}$$

where a: rolling element load by preload of the hub unit; b, c, and d: coefficient not depending on external force; Fx, Fy, and Fz: front and back (x axis) directional component of load, left and right (y axis) directional component of load, and up and down (z axis) directional component of load; Mx and Mz: moments about x axis and z axis; f1 to f8: rolling element loads obtained from outputs of ultrasonic sensors (Sti) (Sto) (Sbi) (Sbo), in which f1 is due to an output of the sensor (Sti) inside the top part, f2 is due to an output of the sensor inside the back part, f3 is due to an output of the sensor (Sbi) inside the bottom part, f4 is due to an output of the sensor inside the front part, f5 is due to an output of the sensor (Sto) outside the top part, f6 is due to an output of the sensor outside the back part, f7 is due to an output of the sensor (Sbo) outside the bottom part, and f8 is due to an output of the sensor outside the front part.

It has not been known at all to use the relationship of equations (1). By using this relationship, it is possible to easily calculate external force acting on a rolling bearing from a rolling element load.

On the other hand, the following equation is established in the case of a wheel (tire).

$$Mx = r \cdot Fy/e \cdot - Fz \qquad \text{equation (2)}$$

where r: wheel rolling radius; and e: difference between the acting point of Fz in y axial direction and the center of the hub unit.

$$My = r \cdot Fx \qquad \text{equation (3)}$$

where My: moment about y axis.

As obvious from the equations mentioned above, the left and right directional component Fy and the up and down direction component Fz can be calculated by using f1 and f3 of the equations (1) and the equation (2). In other words, Fy is obtained from f1+f3, a linear expression including Fz and Mx is obtained from f1-f3, and since Fy in the equation (2) has been calculated, the equation (2) becomes a linear expression including Fz and Mx by assigning Fy, so by making the two linear expressions into a simultaneous equation, Fz and Mx can be obtained.

In this way, the up and down directional component and the left and right directional component of the load acting on the wheel (as well as moment about x axis, correspondingly) can be calculated with two sensors. The up and down directional component and left and right directional component of the load acting on the wheel are important elements to know the cornering state of the wheel, and by calculating them with a small number of sensors (two sensors in total), a rolling bearing device with sensors excellent in cost performance can be obtained.

Note that although f1 and f3 are used in the above-description, those other than this combination (f1 and f5, for example) may be used.

Further, Mx can be obtained from f1+f7, and a linear expression of Fy and Fz can be obtained from f1-f7, and by combining them with the equation (3), Mx, Fy and Fz can be obtained. Then, a linear expression of Fy and Fx can be obtained from f2-f8, so by assigning Fy which has been obtained to this linear expression, the remaining Fx can be obtained. When Fx is obtained, Mx is also obtained. Further, Mz can be obtained from f2+f8.

In this way, all of the six force components acting on the wheel can be obtained with four sensors, so it is possible to realize a rolling bearing device with sensors excellent in cost performance.

Note that although f1, f2, f7 and f8 are used in the description above, those other than this combination (f1, f2, f3 and f6, for example) may be used.

In the equations (1) to (3), the relationship between external force acting on the hub unit and echo ratio is calculated in two steps by using the correlations between a rolling element load and external force and the correlation between a rolling element load and echo ratio, so an error may become large.

In view of this, is preferable to directly calculate the relationship between an echo ratio and external force acting on the hub unit. Assuming that k is an echo ratio by preload of the hub unit l, m and n are coefficients not depending on external force, Fx, Fy and Fz are front and back (x axis) directional component, left and right (y axis) directional component and up and down (z axis) directional component of a load respectively, Mx, My and Mz are moments about x axis y axis and z axis respectively, j1 to j8 are echo ratios obtained from outputs of the ultrasonic sensors (Sti) (Sto) (Sbi), (Sbo) (j1 is due to an output of the ultrasonic sensor (Sti) inside the top part, j2 is due to an output of the sensor inside the back part, j3 is due to an output of the sensor inside the bottom part, j4 is due to an output of the sensor inside the front part, j5 is due to an output of the sensor (Sto) outside the top part, j6 is due to an output of the sensor outside the back part, j7 is due to an output of the sensor (Sbo) outside the bottom part, and j8 is due to an output of the sensor outside the front part), this relationship is expressed as follows.

$$j1=k+lFy+mFz+NMx$$

$$j2=k+lFY+mFx+nMz$$

$$j3=k+lFY-mFz-nMx$$

$$j4=k+lFy-mFx-nMz$$

$$j5=k-lFy+mFz-nMx$$

$$j6=k-lFY+mFX-nMz$$

$$j7=k-lFy-mFz+nMx$$

$$j8=k-lFy-mFx+nMz \qquad \text{equations (4)}$$

A method of calculating six force components using the above-mentioned equations will be explained below. In calculating six force components, a fact that the following equations are established in the case of a wheel (tire) is used in addition to the above-mentioned relationship.

$$Mx=r*Fy+e*Fz \qquad \text{equation (5)}$$

$$My=r*Fx \qquad \text{equation (6)}$$

where r: wheel rolling radius, and e: difference between the acting point of Fz in y axial direction and the center of the hub unit.

By using these two equations, six force components can be obtained by using four equations among the equations of j1 to j8. As an example, six force components can be obtained in the following manner when the equations j1, j2, j3 and j6 are used.

Step 1: To obtain a left and right directional component Fy. Fy is obtained by selecting appropriate two equations (j1 and j3 in this example) from the equations (4), and performing addition or subtraction addition in this example) of the two equations to thereby eliminate Fz and Mx. Fy is obtained from the following equation.

$$Fy=(j1+j3-2k)/2l$$

Step 2: To obtain an up and down directional component Fz. Fz is obtained from a linear expression of Fz and Mx obtained by eliminating Fy from two equations among the equations (4) and a linear expression of Fz and Mx obtained by assigning Fy to the equation (5). Fz is obtained from the following equation.

$$Fz=\{(l-nr)j1-(l+nr)j3+2knr\}/2l(m+ne)$$

Step 3: To obtain a moment Mx about x axis (moment about traveling direction). Mx is obtained by using Fy obtained in step 1 and Fz obtained in step 2. Mx is obtained from the following equation.

$$Mx=rFy+eFz$$

Step 4: To obtain a front and back directional component Fx. Fx is obtained by selecting appropriate two equations (j2 and j6 in this example) from the equations (4), and performing addition or subtraction (addition in this example) of the two equations to thereby eliminate Fx and Mz. Fx is obtained from the following equation.

$$Fx=\{j2+j6-2k\}/2m$$

Step 5: To obtain a moment My about y axis (wheel rotating torque). My is obtained from the following equation by using Fx obtained in step 4.

$$My=rFx$$

Step 6: To obtain a moment Mz about z axis (vertical direction). A linear expression of Fx and Mz is obtained by selecting appropriate two equations (j1 and j3 in this example) from the equations (4), and performing addition or subtraction (subtraction in this example) of the two equations to thereby obtain a linear expression of Fx and Mz, and by selecting appropriate two equations (j2 and j6 in this example) from the equations (4), and performing addition or subtraction (subtraction in this example) of the two equations to thereby eliminate Fy and obtain a linear expression of Fx and Mz, and then eliminating Fx from the two linear expressions. Mz is obtained from the following equation $$Mz=\{-j1+j2-j3-j6+2k\}/2n$$

Figure 14:
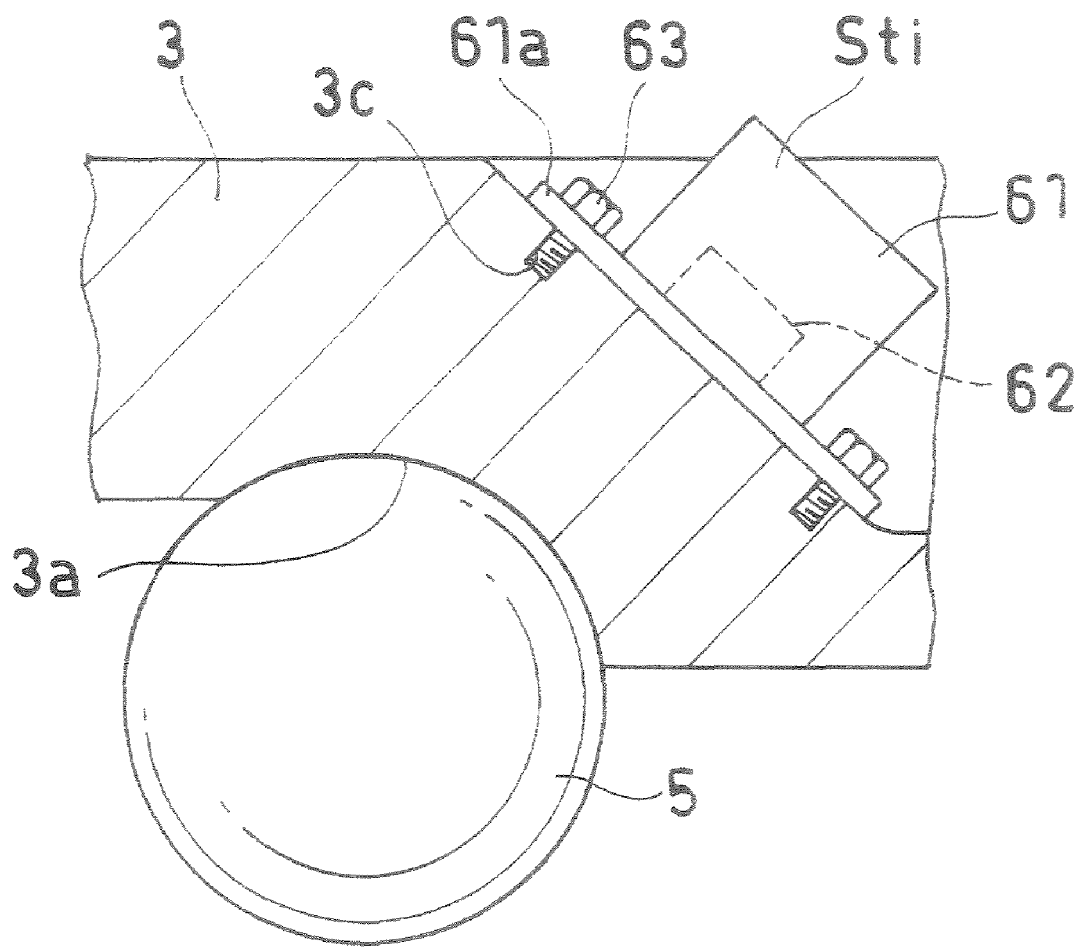
FIG. 14 is an enlarged cross-sectional view corresponding to FIG. 8 showing another embodiment of the mounting structure of the ultrasonic sensor.

Note that the mounting structure of the ultrasonic sensor shown in FIG. 8 is must an example, and is not limited to this. The structure may be one shown in FIG. 14. In FIG. 14, the ultrasonic sensor (Sti) includes a cylindrical case (61) provided with a flange part (61a) to be fixed to the fixed side raceway member (3) and a vibrator (62) disposed inside the case (61). A part where the flange part (61a) is attached of the fixed side raceway member (3) is provided with a plurality of internal threads (3c), and bolts (63) inserted from bolt insertion holes formed in the flange part (61a) are screwed into the internal threads (3c) whereby prescribed preload is set at the case tip, so the ultrasonic sensors (Sti) (Sto) (Sbi) (Sbo) are mounted to the fixed side raceway member (3).

Figure 11:
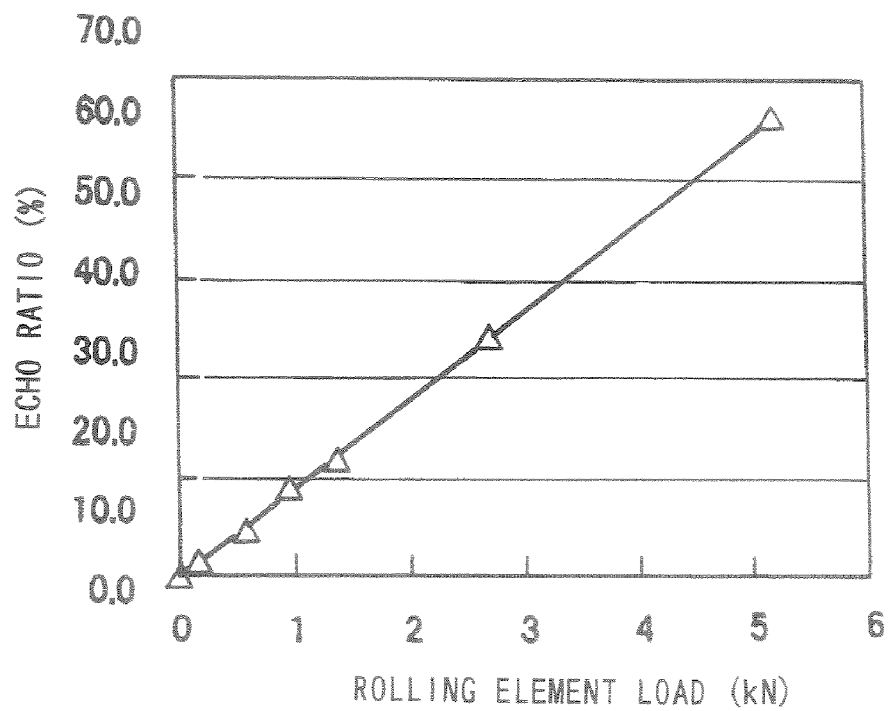
FIG. 11 is a graph showing the relationship between an echo ratio obtained in an ultrasonic sensor and a rolling element load.
Figure 16:
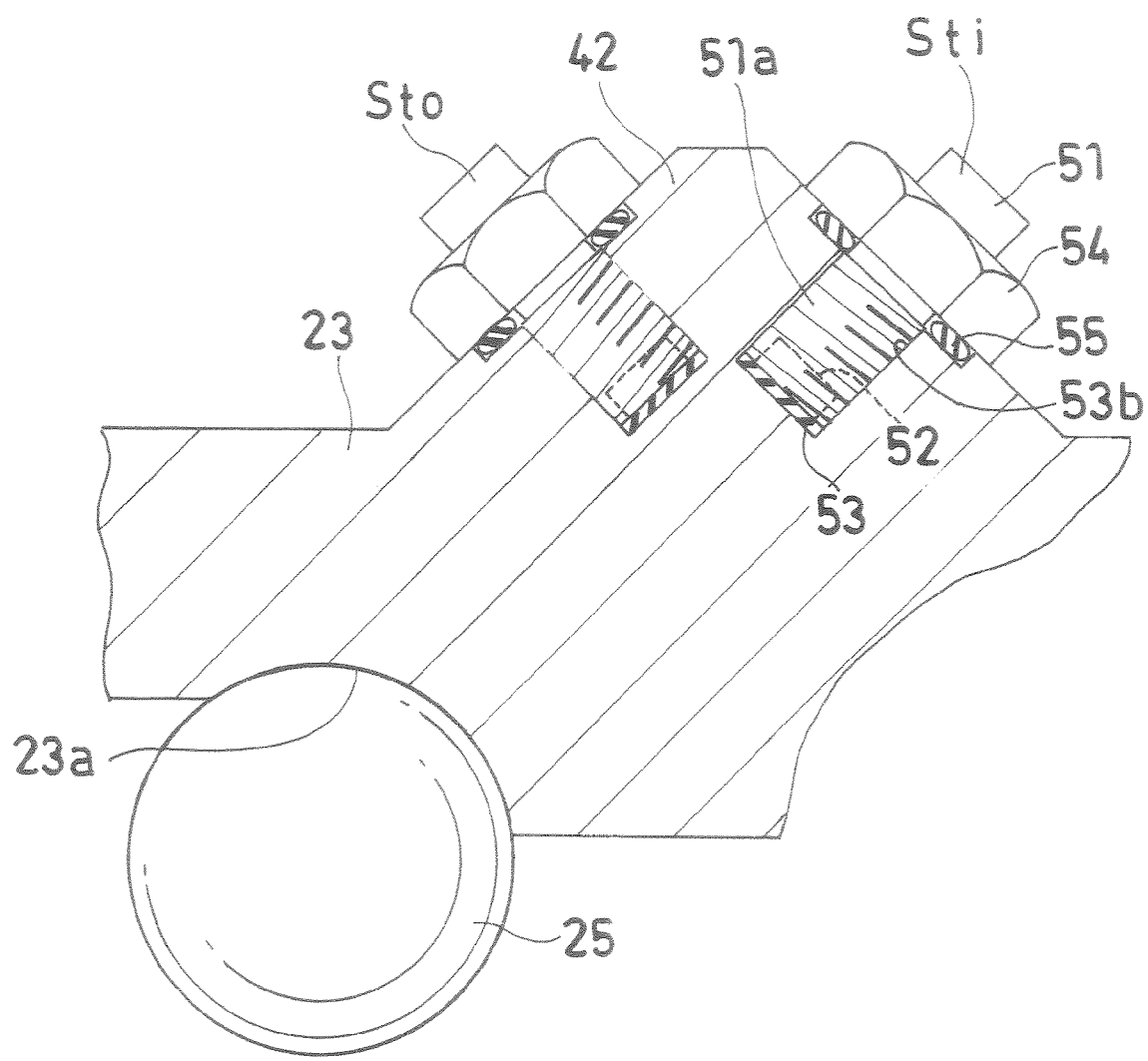
FIG. 16 is an enlarged cross-sectional view of the main part of FIG. 15 showing the mounting structure of an ultrasonic sensor.

Further, as shown in FIGS. 11 and 16, it is possible to prevent intensity from being lowered corresponding to mounting of the sensors, by changing the configuration of the hub unit. In the following explanation, configurations same as those shown in FIGS. 6 to 3 are denoted by the same reference numerals and their explanations are omitted.

Figure 15:
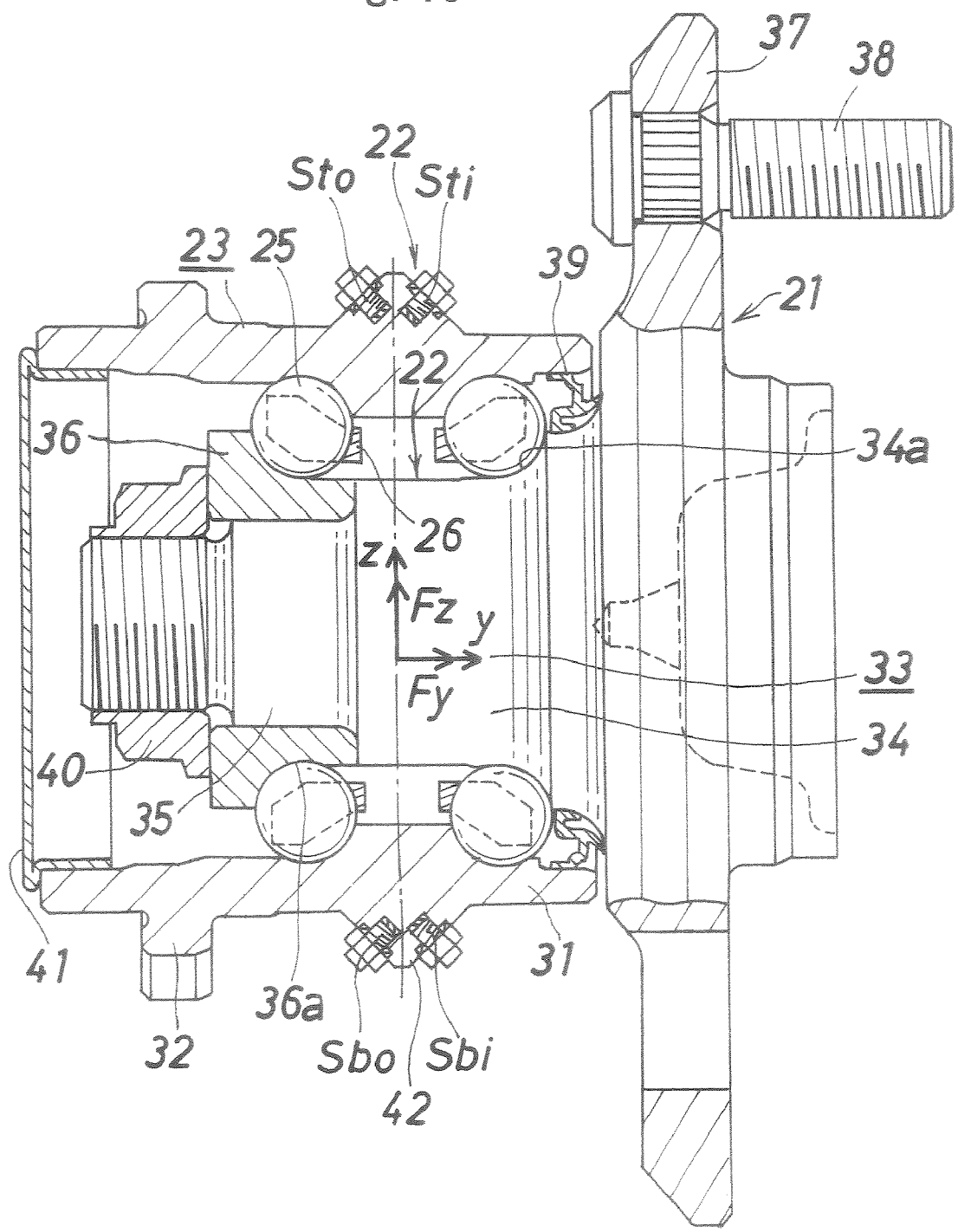
FIG. 15 is a cross-sectional view showing a second embodiment of the rolling bearing device with sensors according to the present invention.

In FIGS. 15 and 16, the ultrasonic sensors (Sti) (Sto) (Sbi) (Sbo) are provided on, in addition to the uppermost part=top part of the body side raceway member (23) (Sti) (Sto) (position shown with A in FIG. 7) and the lowermost part=bottom part of the body side raceway member (23) (Sbi) (Sbo) (position shown with D in FIG. 7 as shown in FIG. 15, back side=back part of the intermediate part of the up and down of the vehicle side raceway member (23) (position shown with B in FIG. 7) and front side=front part of the intermediate part of the up and down of the body side raceway member (23) (position shown with C in FIG. 7), respectively. However the number and arrangement of the ultrasonic sensors are not limited to this. The fixed side raceway member (23) is provided with a sensor mounting protrusion (42) having the section in isosceles right triangular shape such that the right angular part comes to the tip of the protrusion (42), and the ultrasonic sensors (Sti) and (Sto are mounted on two faces interposing the right angular par of the protrusion (42). This mounting structure is same as that shown in FIG. 8 by enlarging it, so same configurations are denoted by the same reference numerals and the explanations thereof are omitted.

Instead of the same configuration as that shown in FIG. 8, configuration shown in FIG. 14 or another configuration may be acceptable. According to this embodiment, the sensor mounting position is reinforced with the protrusion (42), so a drop in intensity associating with mounting of sensors can be prevented. The protrusions (42) may be provided only at sensor mounting positions (uppermost part, lowermost part and intermediate part between up and down of the fixed side raceway member (23)) or may be provided continuously in the peripheral direction (sectional shapes are not limited to constant).

Figure 17:
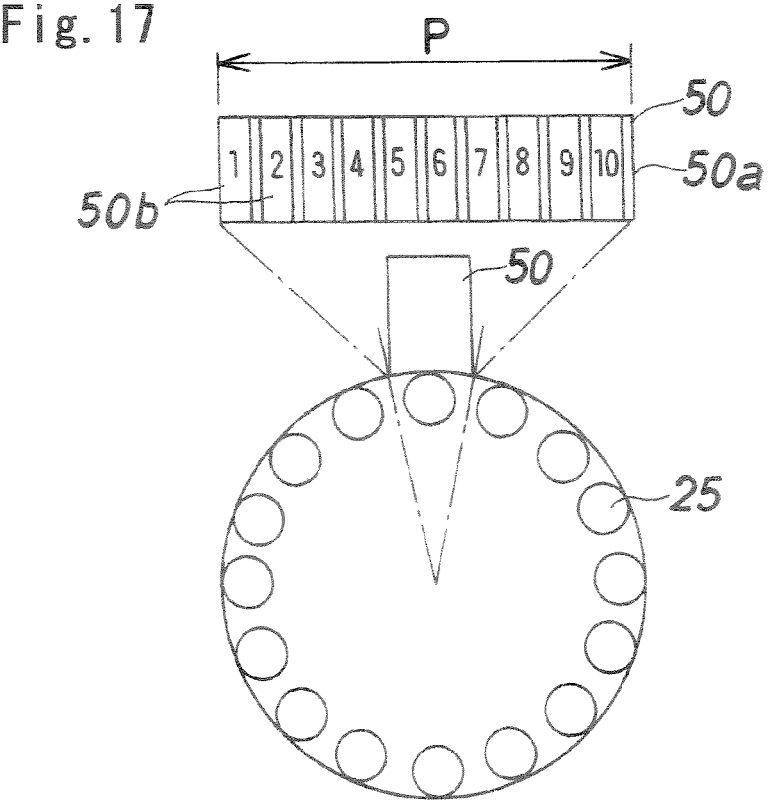
FIG. 17 is a schematic planner sectional view showing a third embodiment of the rolling bearing device with sensors according to the present invention.

As the ultrasonic sensor (2) (Sti) (Sbi) (Sto) (Sbo) described above, a typical one with single vibrator is used. In stead of the ultrasonic sensor with single vibrator, a ultrasonic sensor with multiple vibrators (50) (the respective ultrasonic sensors (Sti) (Sbi) (Sto) (Sbo) are collectively referred by the reference numeral (50)) is so formed that ten vibrators (50b) in total are aligned in equal pitches in the peripheral direction of a concentric circle of P.C.D. of the rolling element (25) inside the case (50a) as shown in FIG. 17. Each of the vibrators (50b) from 1 to 10 can output an ultrasonic wave and receive the reflection wave with the receiving unit thereof to thereby obtain reflection echo. The vibrators (50b) from 1 to 10 are arranged with intervals of p/10 where pitch of the rolling element (25) is P, respectively.

Output from each of the vibrators (50b) from 1 to 10 is obtained as an echo ratio. The relationship between an echo ratio and a rolling element load has a relationship shown in FIG. 11 same at that of a single vibrator, and by using this, a rolling element load can be obtained from an echo ratio.

Figure 18:
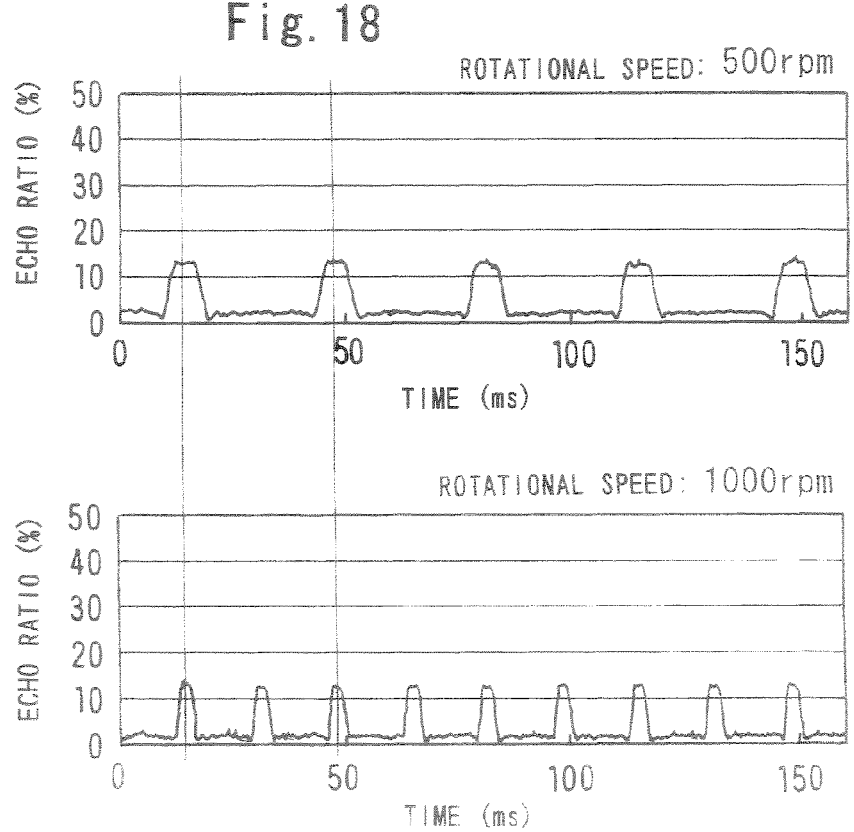
FIG. 18 is a graph showing the relationship between a rotational speed and an echo ratio.
Figure 19:
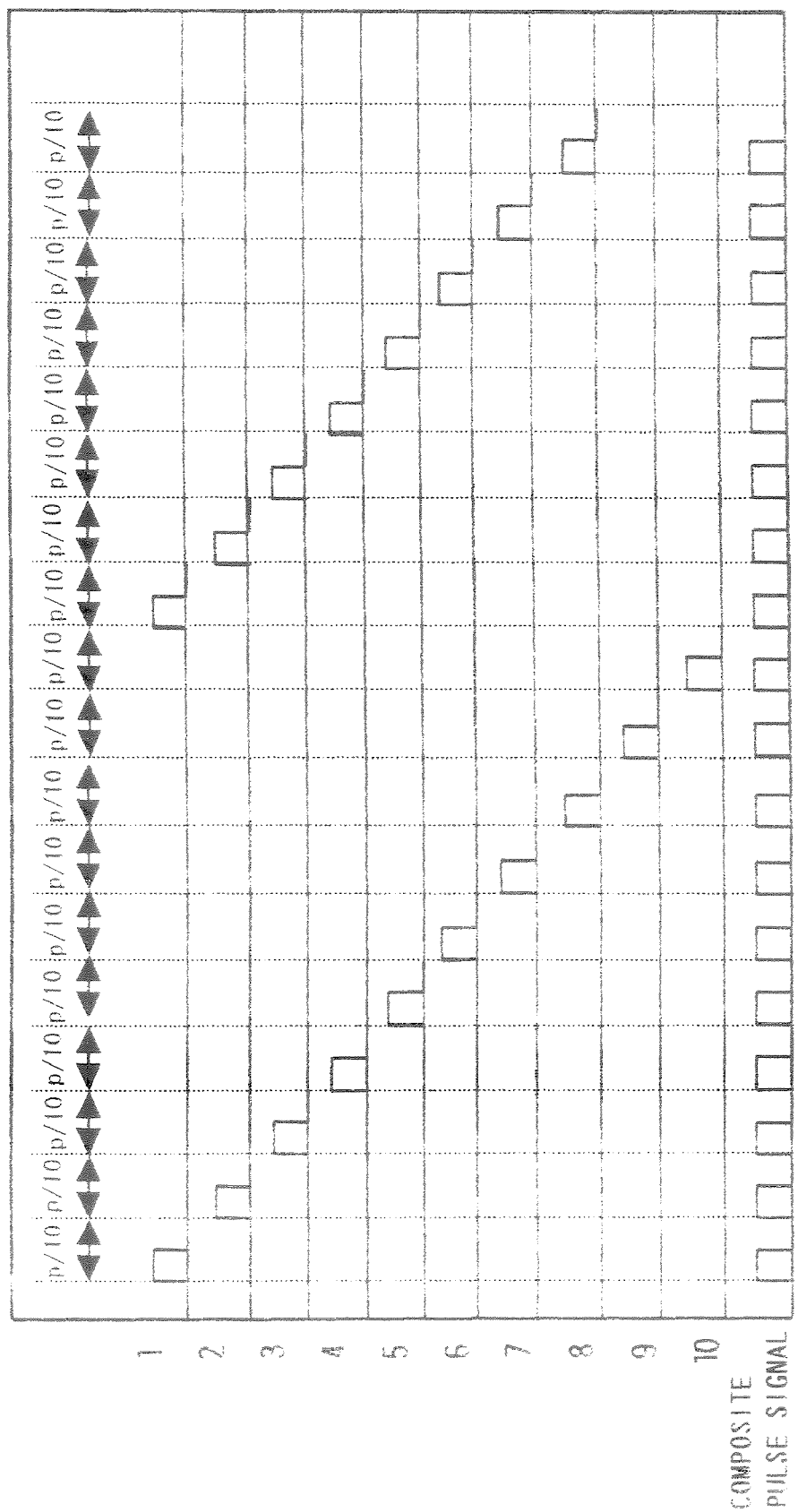
FIG. 19 is chart showing the relationship between pulses obtained from respective ultrasonic sensors and pulses obtained from all ultrasonic sensors.

Further, an echo ratio has a relationship shown in FIG. 18 with a rotational speed, so rotational speed can be obtained by measuring the pulse number of an echo ratio in a certain time period. Since the ultrasonic sensor (50) includes a plurality of vibrators (50b), as the rolling element (25) revolves 1/10 of 1 pitch (=P/10), the ultrasonic sensor (50) detects pulses one by one with the respective vibrators (50b) from 1 to 10, so as a whole, ten times of pulse number (composite pulse signals) can be obtained compared with an ultrasonic sensor with one vibrator. Note that even if the rotational speed changes, the absolute value of echo ratio will not be affected.

Figure 20:
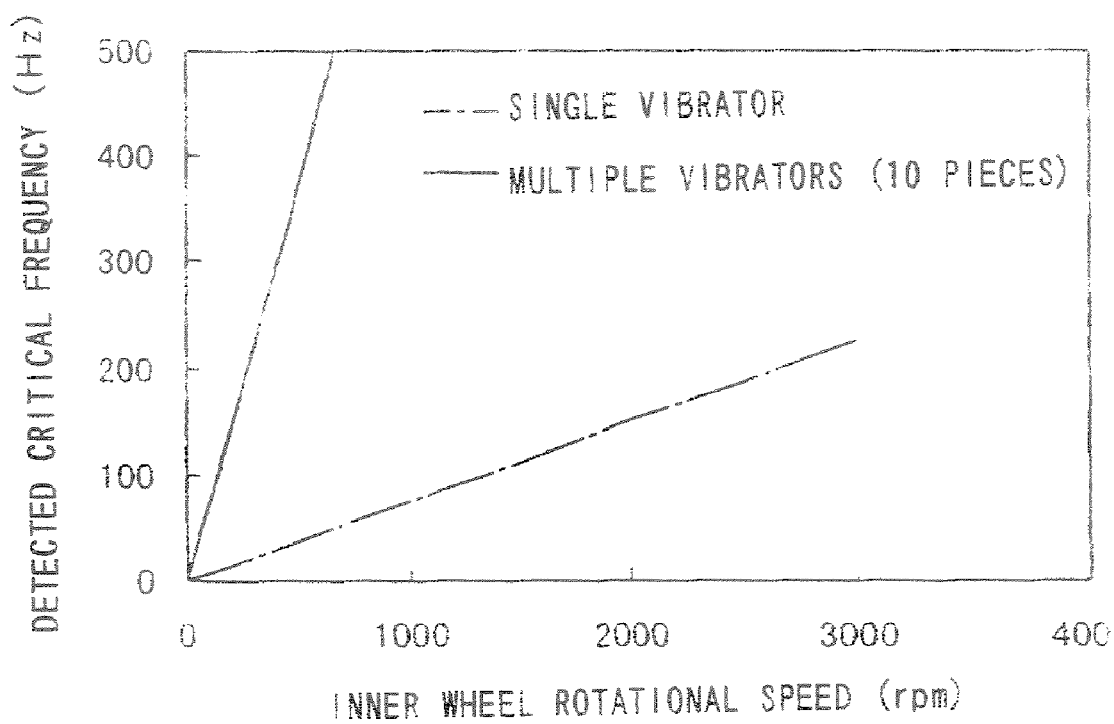
FIG. 20 is a graph in which detected critical frequency is calculated for an ultrasonic sensor with a single vibrator and an ultrasonic sensor with multiple vibratos.

In the ultrasonic sensor (2) (50), when the rolling element load is to be detected, an echo ratio depends not only on the bearing load but also on positions of the rolling elements (5) (5 relative to the sensor (2) (50). Therefore, even though the bearing load is same, an echo ratio changes depending on the positions of the rolling elements (5) (25). When variations of the bearing load are not so large and the rotational speed is fast, no problem about detection accuracy of the rolling element load will arise even with the ultrasonic sensor (2) having a single vibrator. However, when variations of bearing load are large and the rotational speed is slow, a problem may be caused in detecting the rolling element load with the ultrasonic sensor (2) having a single vibrator. A critical load variable frequency which can be detected is expressed simply as [inner ring rotational speed (1/second)*number of vibratos*number of rolling elements/2], which increases in proportion to the number of vibrators. Therefore, in the case of nine rolling elements, the load variable frequency which can be detected becomes one like that shown in FIG. 20. Therefore, if variations in the bearing load is large and the rotational speed is slow, it is effective to use the ultrasonic sensor (50) with multiple vibrators (50b) as shown in FIG. 17, whereby it is possible to detect dynamic load which varies largely with high accuracy.

Note that in the echo ratio outputted from each of the vibrators (50b) from 1 to 10 in the ultrasonic sensor (50) with multiple vibrators (50b), the number of increase and decrease changes over time as the rotational speed of a wheel changes over time. In view of this, by providing, in the processing means of the sensor device (2), a pulse number counting unit for counting the pulse member of the respective vibrators (50b) from 1 to 10 and a rotational speed calculation unit consisting of a revolving speed calculation unit and a rotational speed conversion unit, for calculating the rotational speed by using the pulse number obtained in the pulse number counting unit, it is possible to obtain the rotational speed by counting the number of times (pulse number) each time the echo ratio exceeds a predetermined threshold in the pulse number counting unit, and by using the pulse number in the rotational speed calculating unit.

The rolling element revolving speed required for obtaining the rotational speed is a function of the length in a peripheral direction of rolling element pitch or P.C.D, pulse number and time. As described above, since the vibrators (50b) are arranged to be shifted by p/10 corresponding to the pitch p of the rolling element (25), the revolving speed of the rolling element (25) is obtained by using all pulse numbers from the respective vibrators (50b) from 1 to 10 aligned in the peripheral direction in the revolving speed calculation unit. In the rolling speed conversion unit, the revolving speed is converted into a rotational speed based on well-known equations. In this way, a rotational speed changing over time is obtained by using the pulse number obtained from all vibrators (50b) from 1 to 10.

In this way, it is possible to obtain the rotational speed of the rotational side raceway member (24) by using the ultrasonic sensor (50) for obtaining three-directional force components, and to obtain the rotational information without providing a pulser ring to the rotational side raceway member (24).

Although a hub unit with sensors has been described above, the sensor device can be used by being integrated with any rolling bearing other than a hub unit.

INDUSTRIAL APPLICABILITY

According to the sensor device of this invention, limitations in selecting materials of detected parts can be reduced and additional processing is not required to detected parts for detecting a load acting on a rolling bearing. When applying this to a hub unit with sensors of a motor vehicles three-directional force components of a tire ground contact load can be obtained which leads to an improvement in accuracy of vehicle control.

The invention claimed is:
1. A rolling bearing device with a sensor function, comprising:
   a rolling bearing having a fixed side raceway member, a rotational side raceway member, and a rolling element for facilitating rotation of the rotational side raceway member about a rotational axis; and
   a sensor device, wherein the sensor device includes:
      ultrasonic sensors, provided at at least two positions with a prescribed interval in a peripheral direction of the fixed side raceway member, for detecting a rolling element load acting on the rolling element as an echo ratio; and
      processing means for calculating at least a radial directional component and a rotational axis directional component among three-directional force components of a bearing load acting on the rolling bearing from outputs of respective ultrasonic sensors.

2. The rolling bearing device with a sensor function as claimed in claim 1, wherein each ultrasonic sensor includes a cylindrical case having an external thread formed on an outer periphery thereof and a vibrator disposed inside the case, and the external thread of the case is screwed into an internal thread with a bottom provided in the fixed side raceway member, whereby a prescribed preload is set at a tip of the case.

3. The rolling bearing device with a sensor function as claimed in claim 1, wherein each ultrasonic sensor includes a cylindrical case with a flange part for being mounted to the fixed side raceway member and a vibrator disposed inside the case, and bolts inserted from bolt insertion holes provided in the flange part are screwed into internal threads with bottoms provided in the fixed side raceway member whereby a prescribed preload is set at a tip of the case.

4. The rolling bearing device with a sensor function as claimed in claim 1, wherein the rolling bearing is a hub unit for a motor vehicle, and following equations (1) are provided in the processing means as equations for obtaining a hub unit load acting on the hub unit from the rolling element load:

$$f1 = a + bFy + cFz + dMx$$
$$f2 = a + bFy + cFx + dMz$$
$$f3 = a + bFy - cFz - dMx$$
$$f4 = a + bFy - cFx - dMz$$
$$f5 = a - bFy + cFz - dMx$$
$$f6 = a - bFy + cFx - dMz$$
$$f7 = a - bFy - cFz + dMx$$
$$f8 = a - bFy - cFx + dMz \quad \text{equations (1)}$$

where a is a rolling element load by preload of the hub unit, b, c, d are coefficients not depending on external force, Fx, Fy, Fz are respectively an x axis directional component, a rotational axis (y axis) directional component and a radial (z axis) directional component of the hub unit load, Mx and Mz are hub unit moments about the x axis and z axis, and f1 to f8 are rolling element loads at respective sensor positions.

5. The rolling bearing device with a sensor function as claimed in claim 4, wherein a number of said ultrasonic sensors is two, and the processing means calculates the radial directional component and the rotational directional component of the hub unit load acting on the hub unit from appropriate two equations among the equations (1) and a following equation (2):

$$Mx = r*Fy + e*Fz \quad \text{equation (2)}$$

where r is a rolling radius of a wheel which is mounted to the rotational side raceway member, and e is difference between acting point of Fz and center of the hub unit in an y axial direction.

6. The rolling bearing device with a sensor function as claimed in claim 4, wherein a number of said ultrasonic sensors is four, and the processing means calculates the radial directional component, the x axis directional component and the rotational axis directional component of the hub unit load acting on the hub unit from appropriate four equations among the equations (1), the equation (2) and a following equation (3):

$$My = r*Fx \quad \text{equation (3)}$$

where My is a hub unit moment about a y axis.

7. The rolling bearing device with a sensor function as claimed in claim 1, wherein the rolling bearing is a hub unit for a motor vehicle and the hub unit load acting on the hub unit is calculated by using the echo ratio measured by the ultrasonic sensors, and following equations (4) to (6) are provided in the processing means as equations therefor:

$$j1 = k + lFy + mFz + nMx$$
$$j2 = k + lFy + mFx + nMz$$
$$j3 = k + lFY - mFz - nMx$$
$$j4 = k + lFy - mFx - nMz$$
$$j5 = k - lFy + mFz - nMx$$
$$j6 = k - lFy + mFx - nMz$$
$$j7 = k - lFy - mFz + nMx$$
$$j8 = k - lFy - mFx + nMz \quad \text{equations (4)}$$

$$Mx = r*Fy + e*Fz \quad \text{equation (5)}$$

$$My = r*Fx \quad \text{equation (6)}$$

where k is the echo ratio by preload of the hub unit, l, m, n respectively are coefficients not depending on external force, Fx, Fy, and Fz respectively are an x axis directional component, a rotational axis (y axis) directional component and a radial (z axis) directional component of the hub unit load, Mx, My, and Mz are hub unit moments about the x axis, y axis and z axis, j1 to j8: echo ratios at respective sensor positions, r is a rolling radius of a wheel which is mounted to the rotational side raceway member, e is a difference between an acting point of Fz and a center of the hub unit in an y axial direction.

* * * * *